US012615580B2

(12) United States Patent
Kim et al.

(10) Patent No.: US 12,615,580 B2
(45) Date of Patent: Apr. 28, 2026

(54) TECHNIQUE FOR PERFORMING MULTI-LINK COMMUNICATION IN WIRELESS COMMUNICATION SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Sungjin Park, Seoul (KR); Taewon Song, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 409 days.

(21) Appl. No.: 17/913,641

(22) PCT Filed: Mar. 25, 2021

(86) PCT No.: PCT/KR2021/003704
§ 371 (c)(1),
(2) Date: Sep. 22, 2022

(87) PCT Pub. No.: WO2021/194275
PCT Pub. Date: Sep. 30, 2021

(65) Prior Publication Data
US 2023/0156578 A1 May 18, 2023

(30) Foreign Application Priority Data

Mar. 25, 2020 (KR) ........................ 10-2020-0036472
Jun. 10, 2020 (KR) ........................ 10-2020-0070539

(51) Int. Cl.
*H04W 48/16* (2009.01)
*H04W 12/06* (2021.01)
(Continued)

(52) U.S. Cl.
CPC ........... *H04W 48/16* (2013.01); *H04W 76/15* (2018.02); *H04W 88/10* (2013.01)

(58) Field of Classification Search
CPC ..... H04W 48/16; H04W 76/15; H04W 88/10; H04W 88/06; H04W 12/04; H04W 12/06; H04W 84/12; H04W 28/08
See application file for complete search history.

(56) References Cited

U.S. PATENT DOCUMENTS 11,595,884 B2 * 2/2023 Seok ..................... H04W 48/16
11,723,113 B2 * 8/2023 Kwon ................... H04W 76/38
370/329
(Continued)

OTHER PUBLICATIONS

Jang, Insun et al., LG Electronics, Indication of Multi-link Information, IEEE 802.11-20/0028r2, Mar. 16, 2020, see slides 3-12.
(Continued)

*Primary Examiner* — Khawar Iqbal
(74) *Attorney, Agent, or Firm* — BRYAN CAVE LEIGHTON PAISNER LLP

(57) ABSTRACT

According to various embodiments, a multi-link device (MLD) operating on a plurality of links may perform the steps of: determining a condition for transmitting second link-associated information via a first link among the plurality of links; determining whether or not the second link-associated information has changed; and on the basis of the second link-associated information being changed, transmitting the changed second link-associated information via the first link.

4 Claims, 29 Drawing Sheets

(51) Int. Cl.
    *H04W 76/15*       (2018.01)
    *H04W 88/10*       (2009.01)

(56)            References Cited

U.S. PATENT DOCUMENTS

| | | | |
|---|---|---|---|
| 11,737,018 | B2 * | 8/2023 | Liu ................... H04W 28/0263 |
| | | | 370/318 |
| 12,483,355 | B2 * | 11/2025 | Jang ...................... H04L 5/0092 |
| 12,489,593 | B2 * | 12/2025 | Lim ........................ H04L 69/22 |
| 2006/0094419 | A1 | 5/2006 | Katou |
| 2021/0219363 | A1 * | 7/2021 | Jiang .................... H04W 24/08 |
| 2021/0250848 | A1 * | 8/2021 | Seok ..................... H04W 48/16 |
| 2021/0289442 | A1 * | 9/2021 | Naribole ........... H04W 52/0235 |
| 2021/0321243 | A1 * | 10/2021 | Patil ...................... H04W 48/10 |
| 2021/0321410 | A1 * | 10/2021 | Patil ........................ H04L 45/24 |
| 2022/0132513 | A1 * | 4/2022 | Atefi .................... H04W 72/54 |
| 2023/0217271 | A1 * | 7/2023 | Kim .................. H04W 52/0216 |
| 2024/0031777 | A1 * | 1/2024 | Huang ................... H04W 4/06 |
| 2024/0057048 | A1 * | 2/2024 | Fang ................ H04W 28/0268 |
| 2024/0098721 | A1 * | 3/2024 | Cariou .................. H04W 48/08 |
| 2025/0267743 | A1 * | 8/2025 | Fang .................... H04W 28/06 |
| 2025/0280434 | A1 * | 9/2025 | Patil ..................... H04W 72/53 |

OTHER PUBLICATIONS

Torab, Payam et al., Facebook et al. DMG Channel Switch Announcement, IEEE 802.11-19/1518rl, Sep. 16, 2019, see p. 4.
Huang, Guogang et al., Huawei, Multi-link Association Follow Up, IEEE 802.11-20/0030r4, Mar. 15, 2020, see slide 4.
Naribole, Sharan, Samsung, MLO Constraint Indication and Operating Mode, IEEE 802.11-20/0226r0, Mar. 15, 2020, see slides 2-5.

* cited by examiner (a)

Figure 4:
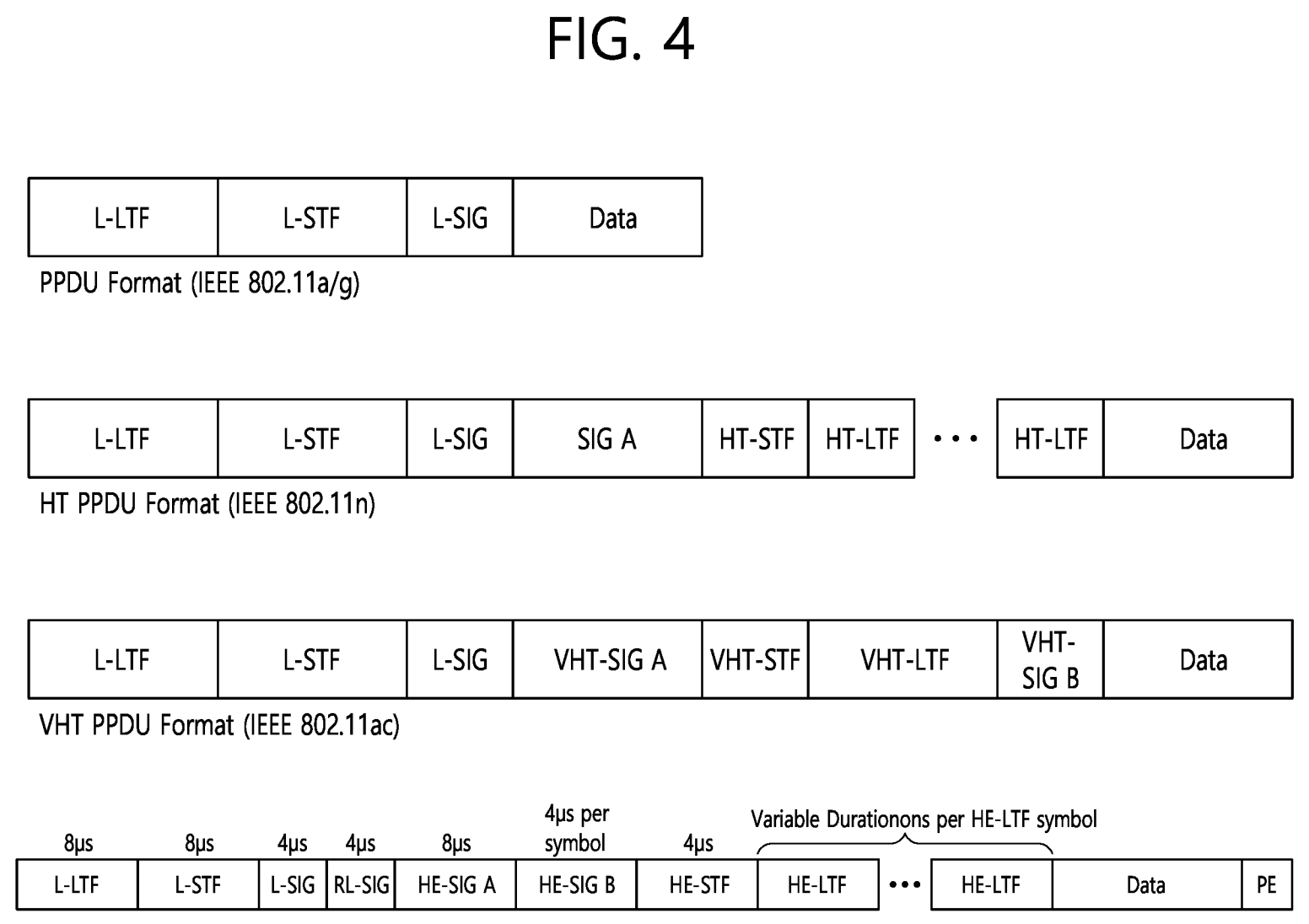

| L-LTF | L-STF | L-SIG | Data |
|---|---|---|---|

PPDU Format (IEEE 802.11a/g)

| L-LTF | L-STF | L-SIG | SIG A | HT-STF | HT-LTF | ··· | HT-LTF | Data |
|---|---|---|---|---|---|---|---|---|

HT PPDU Format (IEEE 802.11n)

| L-LTF | L-STF | L-SIG | VHT-SIG A | VHT-STF | VHT-LTF | VHT-SIG B | Data |
|---|---|---|---|---|---|---|---|

VHT PPDU Format (IEEE 802.11ac)

| 8μs | 8μs | 4μs | 4μs | 8μs | 4μs per symbol | 4μs | Variable Durationons per HE-LTF symbol | | | |
|---|---|---|---|---|---|---|---|---|---|---|
| L-LTF | L-STF | L-SIG | RL-SIG | HE-SIG A | HE-SIG B | HE-STF | HE-LTF | ··· | HE-LTF | Data | PE |

FIG. 12

| 8μs | 8μs | 4μs | 4μs | | | | | |
|-----|-----|-----|-----|-------|---------|---------|--------|------|
| L-LTF | L-STF | L-SIG | RL-SIG | U-SIG | EHT-SIG | EHT-STF | EHT-LTF | Data |

FIG. 15

| Multi-link STA | | |
|---|---|---|
| 5GHz | 6GHz | |
| STA 1 Link 1 | STA 2 Link 2 | STA 3 Link 3 |

FIG. 18 non-AP MLD

Figure 18:
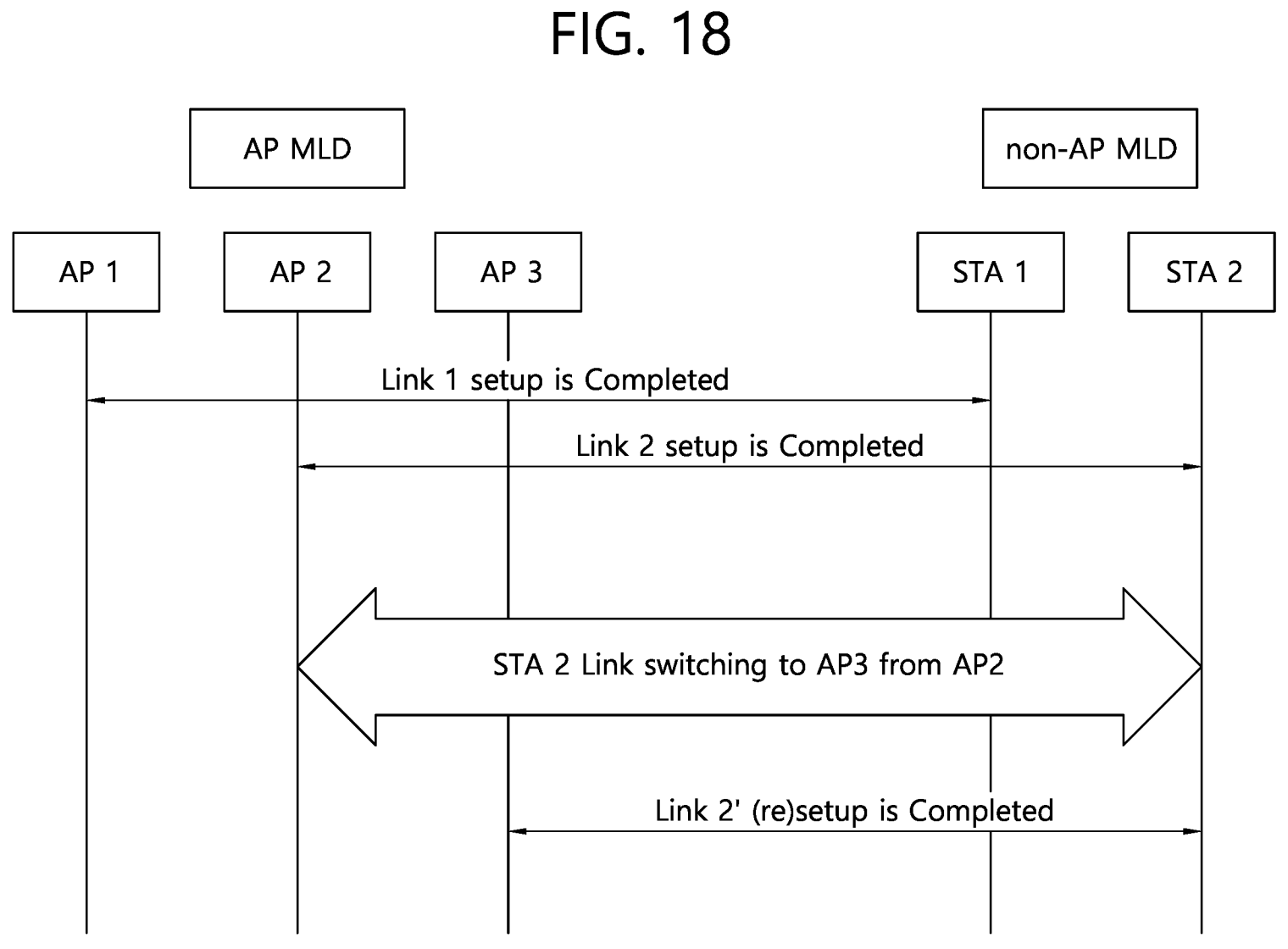

STA 2

STA 1

AP MLD

AP 3

AP 2

AP 1

Link 1 setup is Completed

Link 2 setup is Completed

STA 2 Link switching to AP3 from AP2

Link 2' (re)setup is Completed

FIG. 21

Determining Condition for Receiving Second Link-Associated Information via First Link among Plurality of Links   —S2910

Receiving Changed Second Link-Associated Information through First Link   —S2920

TECHNIQUE FOR PERFORMING MULTI-LINK COMMUNICATION IN WIRELESS COMMUNICATION SYSTEM

This application is the National Stage filing under 35 U.S.C. 371 of International Application No. PCT/KR2021/003704 filed on Mar. 25, 2021, which claims priority to Korean Patent Application Nos. 10-2020-0036472 filed on Mar. 25, 2020 and 10-2020-0070539 filed on Jun. 10, 2020, the contents of which are hereby incorporated by reference herein in their entirety.

BACKGROUND

Technical Field

The present specification relates to a technique for performing multi-link communication in a WLAN system, and more particularly, to a method for transmitting link-related information in multi-link communication and an apparatus supporting the same.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Objects

In the EHT standard, in order to support high throughput and high data rate, a wide bandwidth (for example, 160/320 MHz), 16 streams, and/or multi-link (or multi-band) operation may be used.

In the EHT standard, a device supporting multi-link (that is, multi-link device) may operate on a plurality of links. A multi-link device (for example, an AP multi-link device) needs to transmit a second link-associated information via a first link. In addition, the multi-link device needs to transmit critical information about the second link (or information about STA/AP operating in the second link) through the first link when the critical information is changed.

Technical Solutions

According to various embodiments, a multi-link device (MLD) operating in a plurality of links may perform steps of determining a condition for transmitting second link-associated information via a first link among the plurality of links; determining whether or not the second link-associated information has changed; and based on the second link-associated information being changed, transmitting the changed second link-associated information via the first link.

Technical Effects

The STA/AP included in the multi-link device (for example, a non-AP multi-link device or an AP multi-link device) may transmit information about another STA/AP (or link) in the multi-link device together through one link. Accordingly, there is an effect that the overhead of frame exchange is reduced. In addition, there is an effect of increasing the link use efficiency of the STA/AP and reducing power consumption.

When the information about the STA/AP (or link) is changed, the multi-link device may transmit the changed information. The changed information may include critical information. Accordingly, the multi-link device may transmit the changed information based on the critical information about the STA/AP (or link) being changed.

BRIEF DESCRIPTION OF THE DRAWINGS

FIG. 4 illustrates an example of a PPDU used in an IEEE standard.

FIG. 12 illustrates an example of a PPDU used in the present specification.

FIG. 15 shows an example of the structure of a non-AP MLD.

FIG. 18 shows a specific example in which a link is changed or reconnected.

FIG. 21 shows the operations of an AP MLD and a non-AP MLD for link change or reconnection.

DETAILED DESCRIPTION

Figure 1:
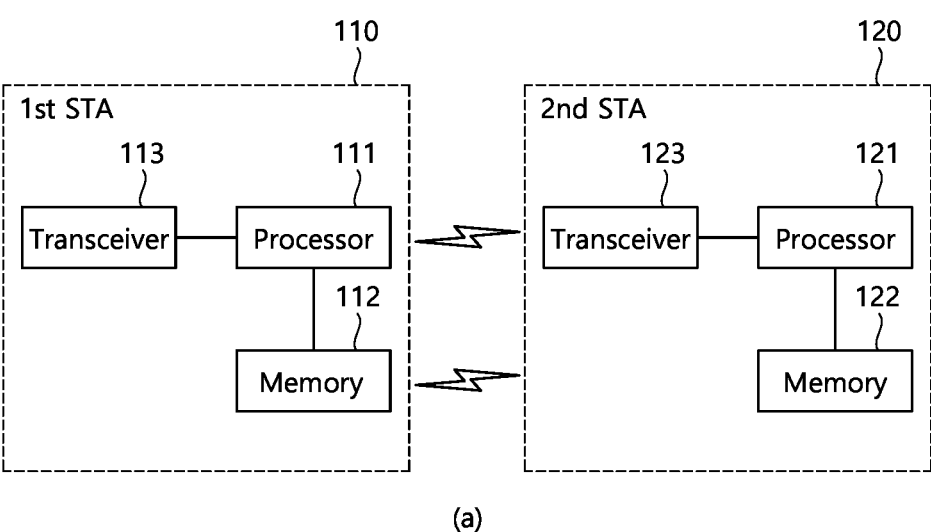
FIG. 1 shows an example of a transmitting apparatus and/or receiving apparatus of the present specification.
Figure 1:
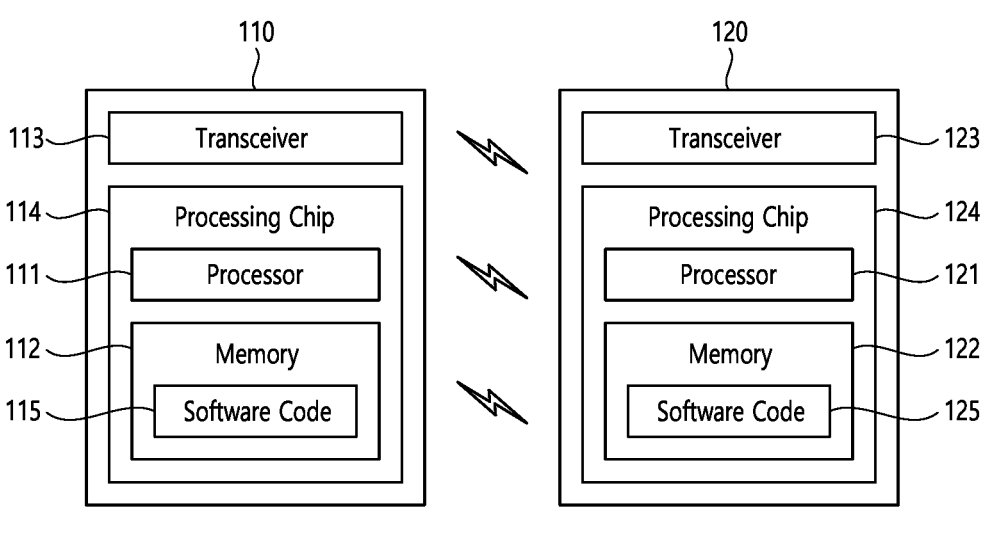

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3$^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: operation of 1) an determining/obtaining/configuring/computing/decoding/encoding bit information of a sub-field (SIG, STF, LTF, Data) included n a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
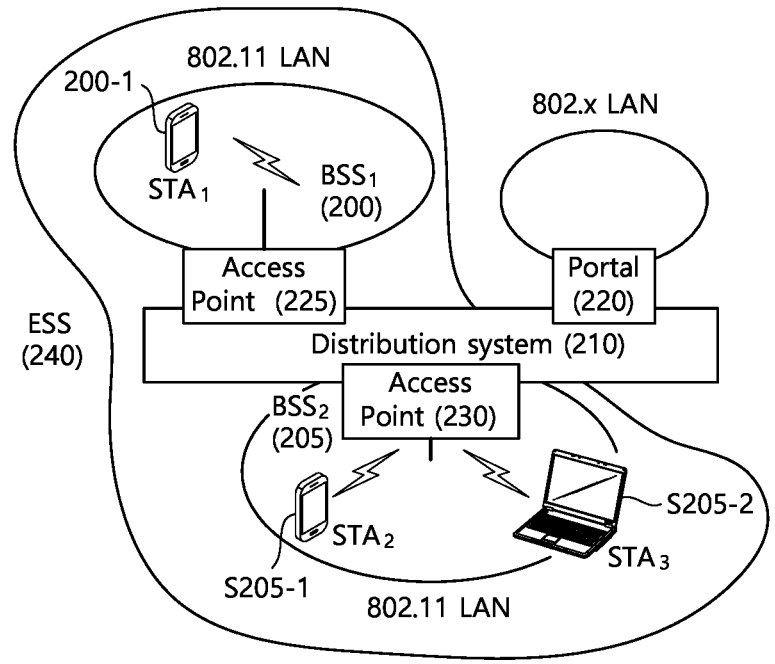
FIG. 2 is a conceptual view illustrating the structure of a wireless local area network (WLAN).
Figure 2:
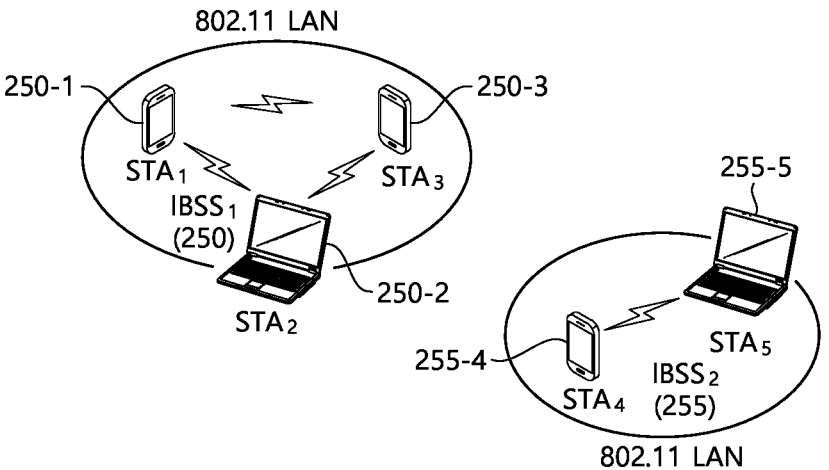

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
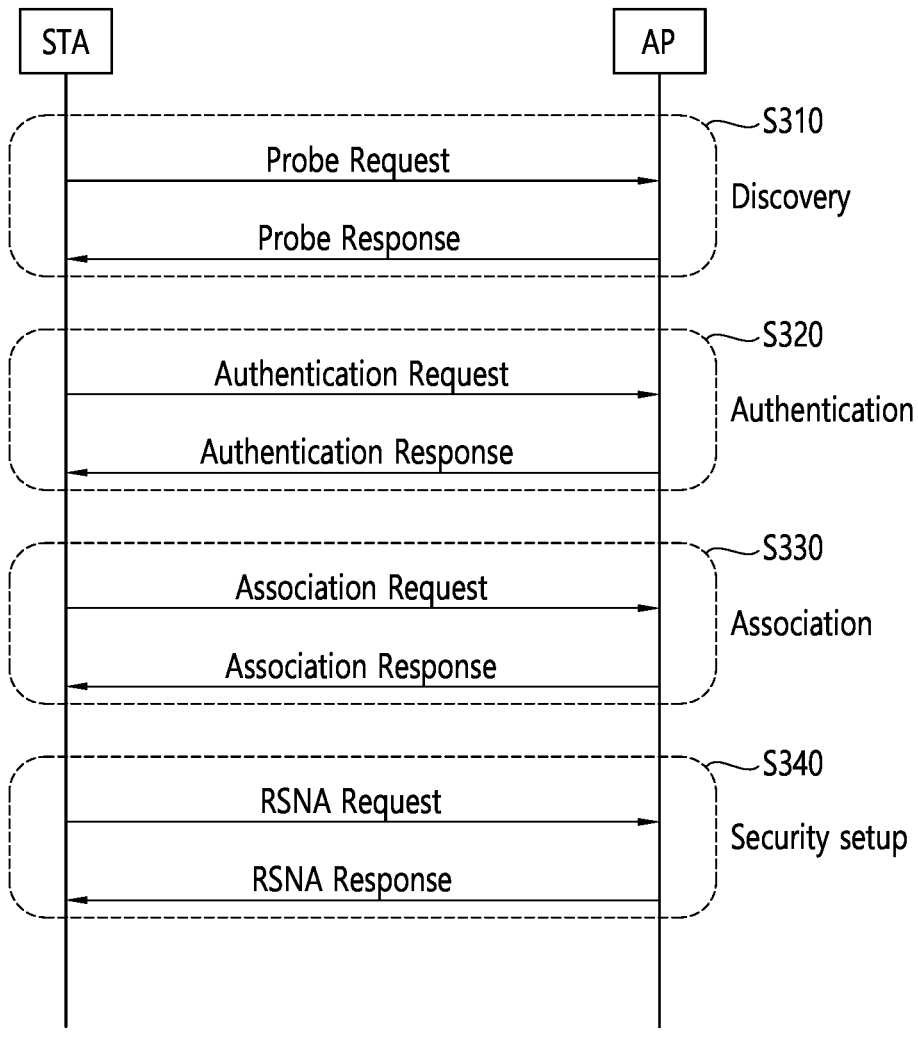
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
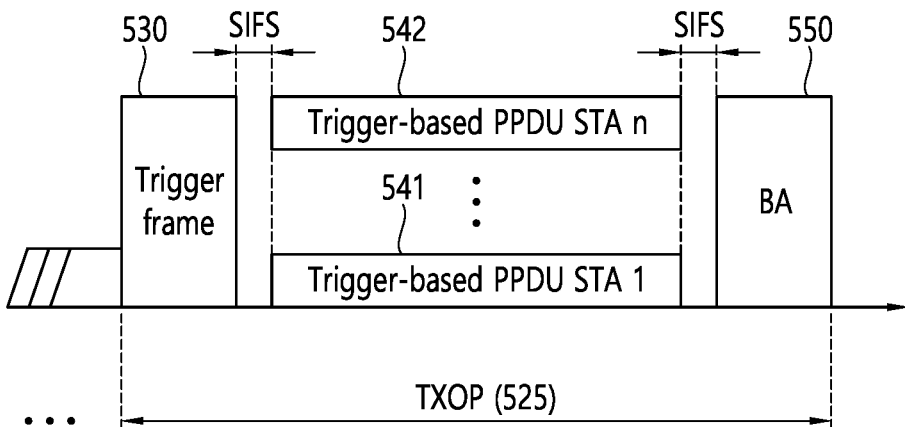
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 530. That is, the transmitting STA may transmit a PPDU including the trigger frame 530. Upon receiving the PPDU including the trigger frame, a trigger-based (TB) PPDU is transmitted after a delay corresponding to SIFS.

TB PPDUs 541 and 542 may be transmitted at the same time period, and may be transmitted from a plurality of STAs (e.g., user STAs) having AIDs indicated in the trigger frame 530. An ACK frame 550 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
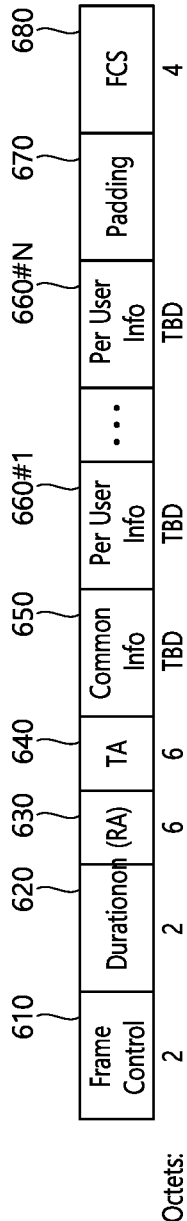
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 610 of FIG. 6 may include information related to a MAC protocol version and extra additional control information. A duration field 620 may include time information for NAV configuration or information related to an identifier (e.g., AID) of a STA.

In addition, an RA field 630 may include address information of a receiving STA of a corresponding trigger frame, and may be optionally omitted. A TA field 640 may include address information of a STA (e.g., an AP) which transmits the corresponding trigger frame. A common information field 650 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 660 #1 to 660 #N corresponding to the number of receiving STAs which receive the trigger frame are preferably included. The per user information field may also be called an "allocation field".

In addition, the trigger frame of FIG. 6 may include a padding field 670 and a frame check sequence field 680.

Each of the per user information fields 660 #1 to 660 #N shown in FIG. 6 may include a plurality of subfields.

Figure 7:
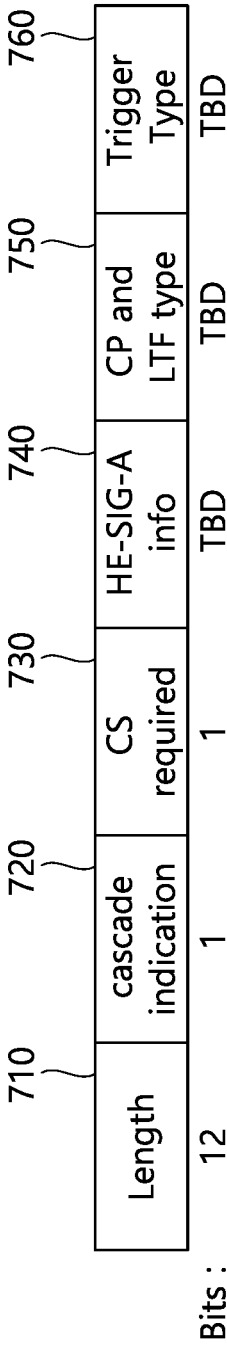
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 710 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 710 of the trigger frame may be used to indicate the length of the corresponding uplink PPDU.

In addition, a cascade identifier field 720 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 730 indicates whether a wireless medium state or a NAV or the like is necessarily considered in a situation where a receiving device which has received a corresponding trigger frame transmits a corresponding uplink PPDU.

An HE-SIG-A information field 740 may include information for controlling content of a SIG-A field (i.e., HE-SIG-A field) of the uplink PPDU in response to the corresponding trigger frame.

A CP and LTF type field 750 may include information related to a CP length and LTF length of the uplink PPDU transmitted in response to the corresponding trigger frame. A trigger type field 760 may indicate a purpose of using the corresponding trigger frame, for example, typical triggering, triggering for beamforming, a request for block ACK/NACK, or the like.

It may be assumed that the trigger type field 760 of the trigger frame in the present specification indicates a trigger frame of a basic type for typical triggering. For example, the trigger frame of the basic type may be referred to as a basic trigger frame.

Figure 8:
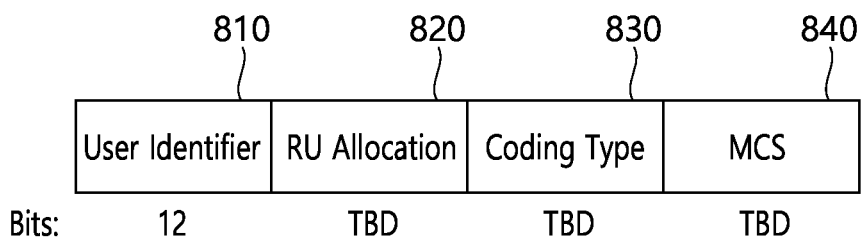
FIG. 8 illustrates an example of a subfield included in a per user information field.

FIG. 8 illustrates an example of a subfield included in a per user information field. A user information field 800 of FIG. 8 may be understood as any one of the per user information fields 1160 #1 to 1160 #N mentioned above with reference to FIG. 11. A subfield included in the user information field 800 of FIG. 8 may be partially omitted, and an extra subfield may be added. In addition, a length of each subfield illustrated may be changed.

A user identifier field 810 of FIG. 8 indicates an identifier of a STA (i.e., receiving STA) corresponding to per user information. An example of the identifier may be the entirety or part of an association identifier (AID) value of the receiving STA.

In addition, an RU allocation field 820 may be included. That is, when the receiving STA identified through the user identifier field 810 transmits a TB PPDU in response to the trigger frame, the TB PPDU is transmitted through an RU indicated by the RU allocation field 820.

The subfield of FIG. 8 may include a coding type field 830. The coding type field 830 may indicate a coding type of the TB PPDU. For example, when BCC coding is applied to the TB PPDU, the coding type field 830 may be set to '1', and when LDPC coding is applied, the coding type field 830 may be set to '0'.

In addition, the subfield of FIG. 8 may include an MCS field 840. The MCS field 840 may indicate an MCS scheme applied to the TB PPDU. For example, when BCC coding is applied to the TB PPDU, the coding type field 830 may be set to '1', and when LDPC coding is applied, the coding type field 830 may be set to '0'.

Figure 9:
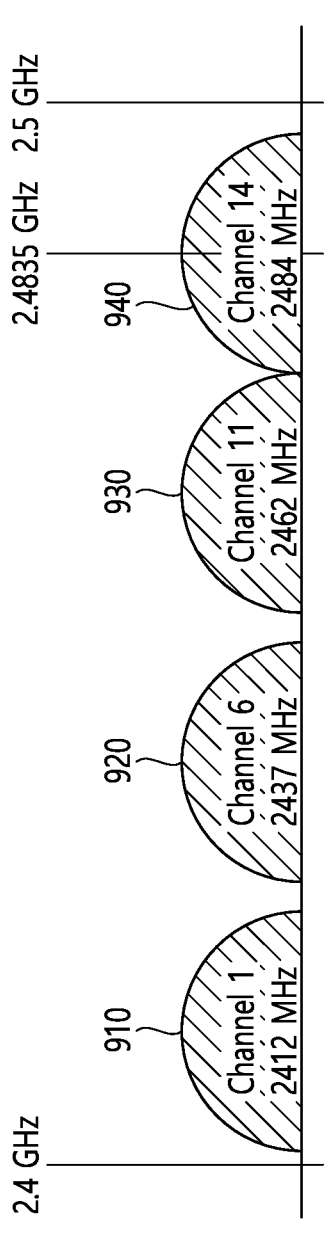
FIG. 9 illustrates an example of a channel used/supported/defined within a 2.4 GHz band.

FIG. 9 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 9 exemplifies 4 channels within a 2.4 GHz band. Each of 1st to 4th frequency domains 910 to 940 shown herein may include one channel. For example, the 1st frequency domain 910 may include a channel 1 (a 20 MHz channel having an index 1). In this case, a center frequency of the channel 1 may be set to 2412 MHz. The 2nd frequency domain 920 may include a channel 6. In this case, a center frequency of the channel 6 may be set to 2437 MHz. The 3rd frequency domain 930 may include a channel 11. In this case, a center frequency of the channel 11 may be set to 2462 MHz. The 4th frequency domain 940 may include a channel 14. In this case, a center frequency of the channel 14 may be set to 2484 MHz.

Figure 10:
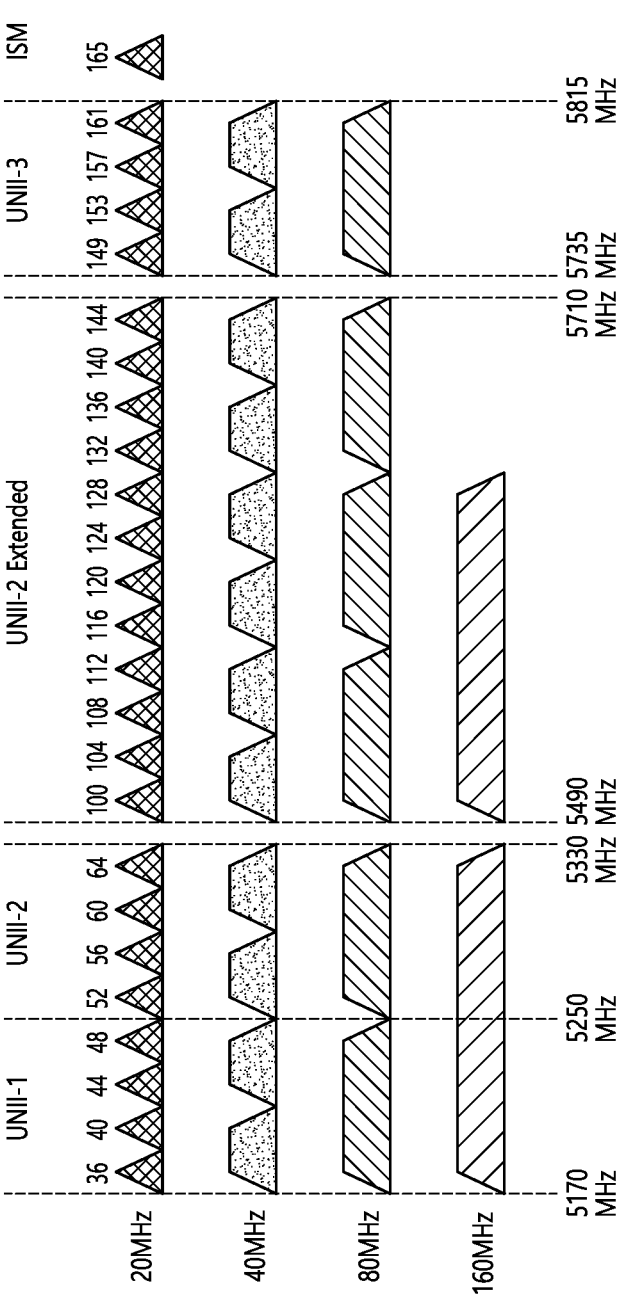
FIG. 10 illustrates an example of a channel used/supported/defined within a 5 GHz band.

FIG. 10 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHZ and less than 6 GHZ (or less than 5.9 GHZ) are used/supported/defined. Alternatively, the 5 GHz band may include a plurality of channels between 4.5 GHz and 5.5 GHz. A specific numerical value shown in FIG. 10 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 11:
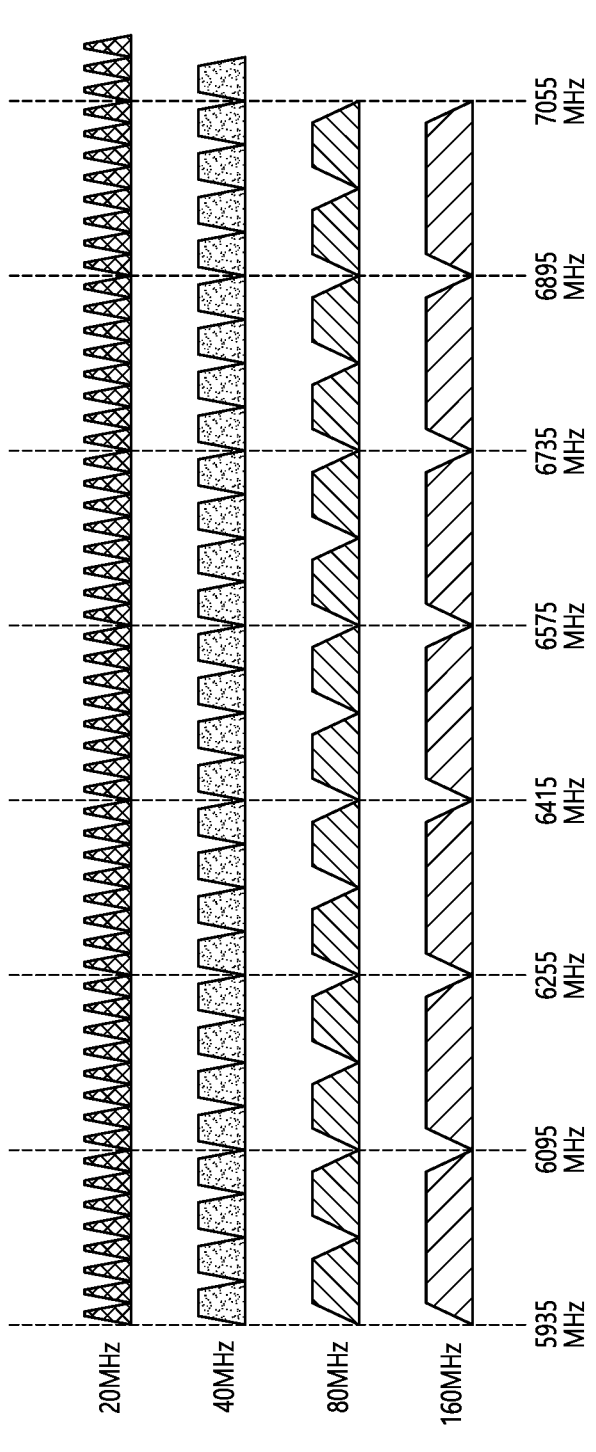
FIG. 11 illustrates an example of a channel used/supported/defined within a 6 GHz band.

FIG. 11 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 11 may be changed.

For example, the 20 MHz channel of FIG. 11 may be defined starting from 5.940 GHz. Specifically, among 20 MHz channels of FIG. 11, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 11 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 11 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 11, a 240 MHz channel or a 320 MHz channel may be additionally added.

Figure 12:
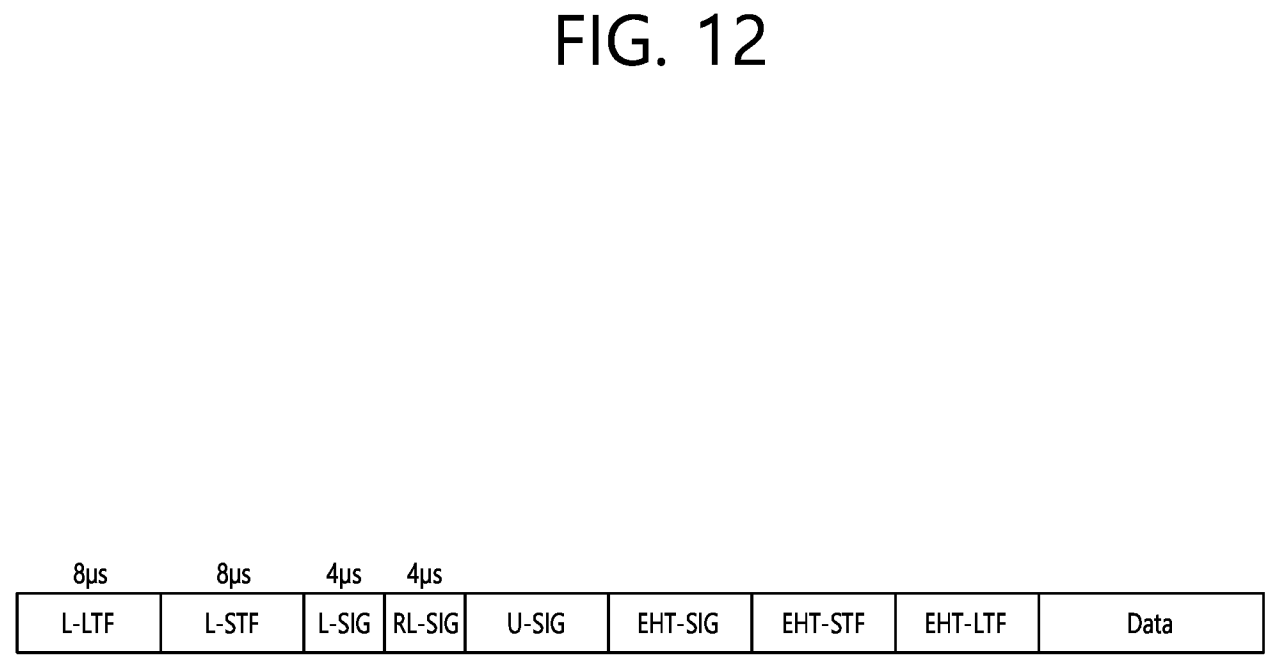

FIG. 12 illustrates an example of a PPDU used in the present specification.

The PPDU of FIG. 12 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 12 may indicate the entirety or part of a PPDU type used in the EHT system. For example, the example of FIG. 12 may be used for both of a single-user (SU) mode and a multi-user (MU) mode. In other words, the PPDU of FIG. 12 may be a PPDU for one receiving STA or a plurality of receiving STAs. When the PPDU of FIG. 12 is used for a trigger-based (TB) mode, the EHT-SIG of FIG. 12 may be omitted. In other words, a STA which has received a trigger frame for uplink-MU (UL-MU) may transmit the PPDU in which the EHT-SIG is omitted in the example of FIG. 12.

In FIG. 12, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 12 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 12, the L-LTE and the L-STF may be the same as those in the conventional fields.

The L-SIG field of FIG. 12 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

Figure 13:
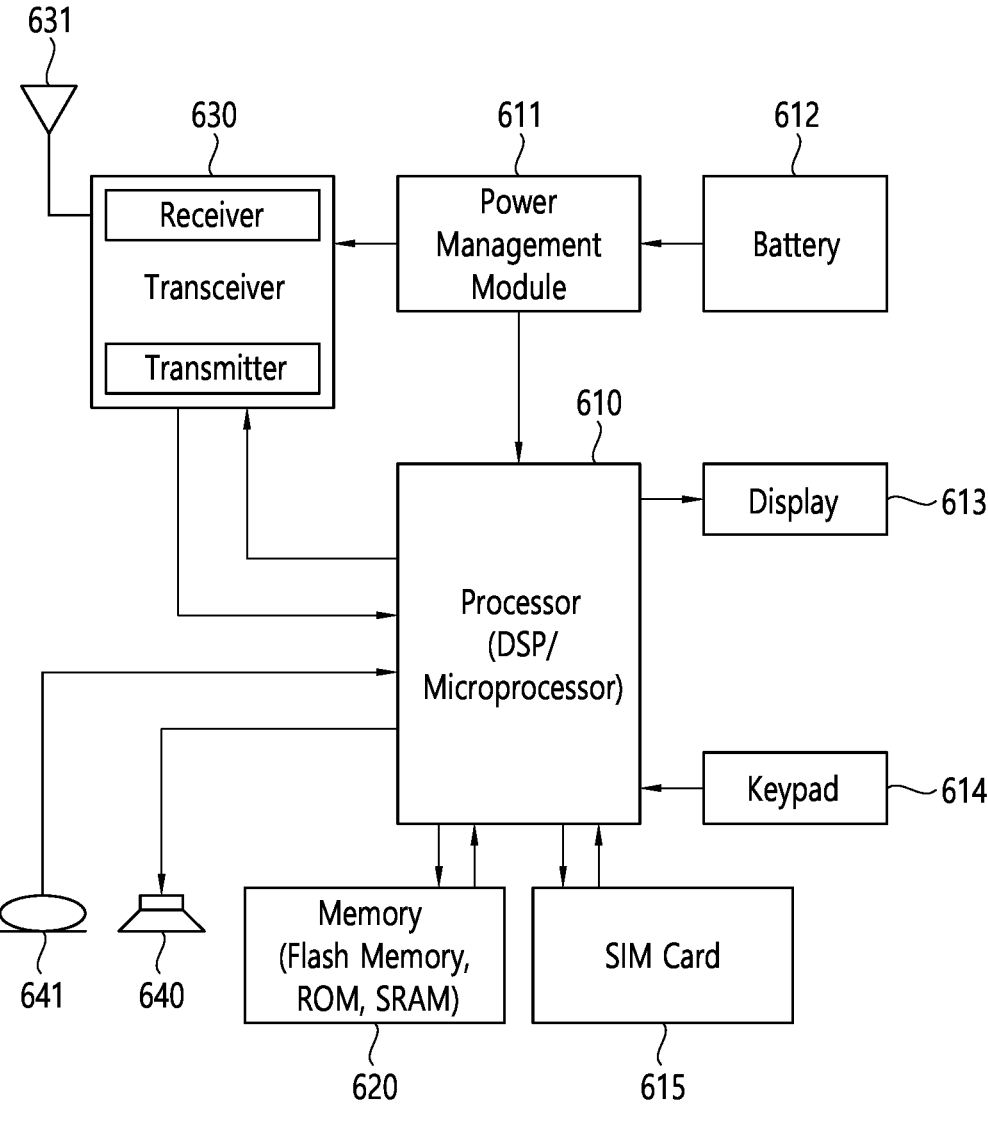
FIG. 13 illustrates an example of a modified transmission device and/or receiving device of the present specification.

A universal SIG (U-SIG) may be inserted after the RL-SIG of FIG. 13. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 12. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 12 may include control information for the receiving STA. The EHT-SIG may be transmitted through at least one symbol, and one symbol may have a length of 4 μs. Information related to the number of symbols used for the EHT-SIG may be included in the U-SIG.

The PPDU of FIG. 12 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 12. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 12. The PPDU of FIG. 12 may be used to transmit/receive frames of various types. For example, the PPDU of FIG. 12 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 12 may be used for a management frame. An example of the management frame may include a beacon frame, a (re-) association request frame, a (re-) association response frame, a probe request frame, and a probe response frame. For example, the PPDU of FIG. 12 may be used for a data frame. For example, the PPDU of FIG. 12 may be used to simultaneously transmit at least two or more of the control frame, the management frame, and the data frame.

FIG. 13 illustrates an example of a modified transmission device and/or receiving device of the present specification.

Each device/STA of the sub-figure (a)/(b) of FIG. 1 may be modified as shown in FIG. 13. A transceiver 630 of FIG. 13 may be identical to the transceivers 113 and 123 of FIG. 1. The transceiver 630 of FIG. 13 may include a receiver and a transmitter.

A processor 610 of FIG. 13 may be identical to the processors 111 and 121 of FIG. 1. Alternatively, the processor 610 of FIG. 13 may be identical to the processing chips 114 and 124 of FIG. 1.

A memory 620 of FIG. 13 may be identical to the memories 112 and 122 of FIG. 1. Alternatively, the memory 620 of FIG. 13 may be a separate external memory different from the memories 112 and 122 of FIG. 1.

Referring to FIG. 13, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 13, a speaker 640 may output a result related to a sound processed by the processor 610. A microphone 641 may receive an input related to a sound to be used by the processor 610.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 14:
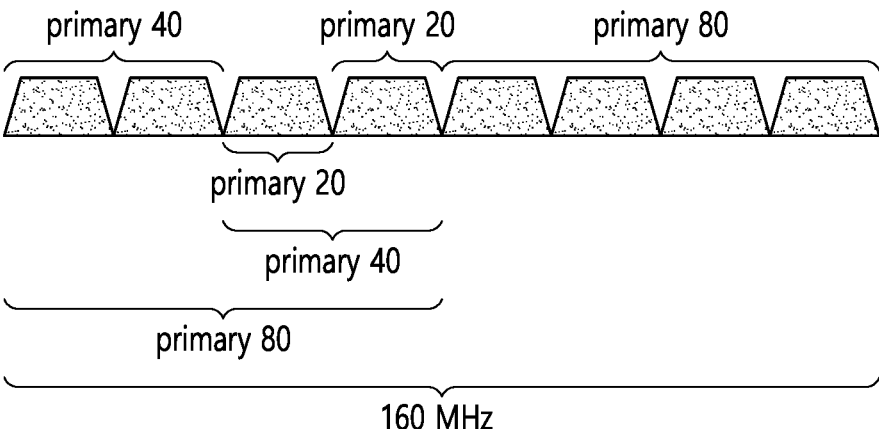
FIG. 14 shows an example of channel bonding.

FIG. 14 shows an example of channel bonding. As shown in FIG. 14, the primary 20 MHz channel and the secondary 20 MHz channel may make up a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the Primary 20 MHz channel, the Secondary 20 MHz channel, the Secondary 40 MHz channel, and the Secondary 80 MHz channel can be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by a STA in the present disclosure will be described.

For example, in the example of FIG. 14, if the Primary 20 MHz channel, the Secondary 40 MHz channel, and the Secondary 80 MHz channel are all in the idle state, but the Secondary 20 MHz channel is in the busy state, bonding to the secondary 40 MHz channel and the secondary 80 MHz channel may not be possible. In this case, the STA may configure a 160 MHz PPDU and may perform a preamble puncturing on the preamble transmitted through the secondary 20 MHz channel (for example, L-STF, L-LTF, L-SIG, RL-SIG, U-SIG, HE-SIG-A, HE-SIG-B, HE-STF, HE-LTF, EHT-SIG, EHT-STF, EHT-LTF, etc.), so that the STA may transmit a signal through a channel in the idle state. In other words, the STA may perform preamble puncturing for some bands of the PPDU. Information on preamble puncturing (for example, information about 20/40/80 MHz channels/bands to which puncturing is applied) may be included in a signal field (for example, HE-SIG-A, U-SIG, EHT-SIG) of the PPDU.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 9, the 5 GHz band shown in FIG. 10, and the 6 GHz band shown in FIG. 11 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHZ/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC_Voice (AC_VO)) according to the conventional WLAN standard may be defined.

For example, it may be preset that all TIDs are mapped for uplink/downlink link. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

According to an embodiment, the MLD may include a non-AP MLD and an AP-MLD. The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs a STA function, it may be referred to as a non-AP MLD.

In the following specification, MLD has one or more connected STAs and has one MAC service access point (SAP) that connects to an upper link layer (Logical Link Control, LLC). MLD may mean a physical device or a logical device. Hereinafter, a device may mean an MLD.

In addition, the MLD may include at least one STA connected to each link of the multi-link. For example, the processor of the MLD may control the at least one STA. For example, the at least one STA may be independently configured and operated. The at least one STA may include a processor and a transceiver, respectively. For example, the at least one STA may operate independently regardless of the processor of the MLD.

In the following specification, for the convenience of description, it is described that the MLD (or the processor of the MLD) controls at least one STA, but is not limited thereto. As described above, the at least one STA may transmit/receive a signal independently regardless of the MLD.

According to an embodiment, an AP MLD or a non-AP MLD may be configured in a structure having a plurality of links. In other words, the non-AP MLD may support a plurality of links. The non-AP MLD may include a plurality of STAs. A plurality of STAs may have a link for each STA.

In the EHT standard (802.11be standard), a Multi-Link Device (MLD) structure in which one AP/non-AP MLD supports multiple links is considered as a major technology. STAs included in the non-AP MLD may transmit information on other STAs in the non-AP MLD together through one link. Accordingly, there is an effect that the overhead of frame exchange is reduced. In addition, there is an effect of increasing the link usage efficiency of the STA and reducing power consumption.

FIG. 15 shows an example of the structure of a non-AP MLD.

Referring to FIG. 15, the non-AP MLD may have a structure having a plurality of links. In other words, the non-AP MLD may support a plurality of links. The non-AP MLD may include a plurality of STAs. A plurality of STAs may have a link for each STA. FIG. 15 shows an example of a structure of a non-AP MLD, but the structure of an AP MLD may be configured the same as an example of a structure of a non-AP MLD shown in FIG. 15.

For example, the non-AP MLD may include STA 1, STA 2, and STA 3. STA 1 may operate on link 1. Link 1 may be included in the 5 GHz band. STA 2 may operate on link 2. Link 2 may be included in the 6 GHz band. STA 3 may operate in link 3. Link 3 may be included in the 5 GHz band. The bands including link 1/2/3 may be an example, and they may be included in 2.4, 5, and 6 GHz.

As such, in the case of an AP/non-AP MLD supporting multi-link, each AP of the AP MLD and each STA of the non-AP MLD may be connected to each link through a link setup process. And at this time, the connected link may be changed or reconnected to another link by an AP MLD or a non-AP MLD depending on the situation.

In addition, in the EHT standard, in order to reduce power consumption, a link may be divided into an anchored link or a non-anchored link. The anchored link or the non-anchored link can be called variously. For example, the anchored link may be called a primary link. The non-anchored link may be called a secondary link.

According to an embodiment, the AP MLD supporting multi-link can be managed by designating each link as an anchored link or a non-anchored link. AP MLD may support one or more Links among a plurality of Links as the anchored link. The non-AP MLD can be used by selecting one or more of its own anchored links from the Anchored Link List (the list of anchored links supported by the AP MLD).

For example, the anchored link may be used for non-data frame exchange (i.e. Beacon and Management frame) as well as frame exchange for synchronization. Also, a non-anchored link can be used only for data frame exchange.

The non-AP MLD can perform monitoring (or monitor) only the anchored link to receive the Beacon and Management frame during the idle period. Therefore, in the case of a non-AP MLD, it must be connected to at least one anchored link to receive a beacon and a management frame. The one or more anchored links should always maintain the enabled state. In contrast, the non-anchored links can only be used for data frame exchange. Therefore, the STA corresponding to the non-anchored link (or the STA connected to the non-anchored link) may enter a doze during the idle period when the channel/link is not used. This has the effect of reducing power consumption.

Therefore, in the following specification, a protocol in which an AP MLD or a non-AP MLD dynamically recommends or requests a link reconnection according to a situation may be proposed for an efficient link connection. In addition, in the following specification, an anchored link reconnection protocol in consideration of the characteristics of an anchored link used for the purpose of power reduction as well as a general link may be additionally proposed.

Embodiment for Link Change and Reconnection

According to an embodiment, each link between the AP MLD and the non-AP MLD may be determined in an Association or (re) Association process. At this time, the AP MLD and the non-AP MLD can perform frame exchange through the connected link. A specific embodiment in which the AP MLD and the non-AP MLD are connected through the link setup process may be described with reference to FIG. 16.

Figure 16:
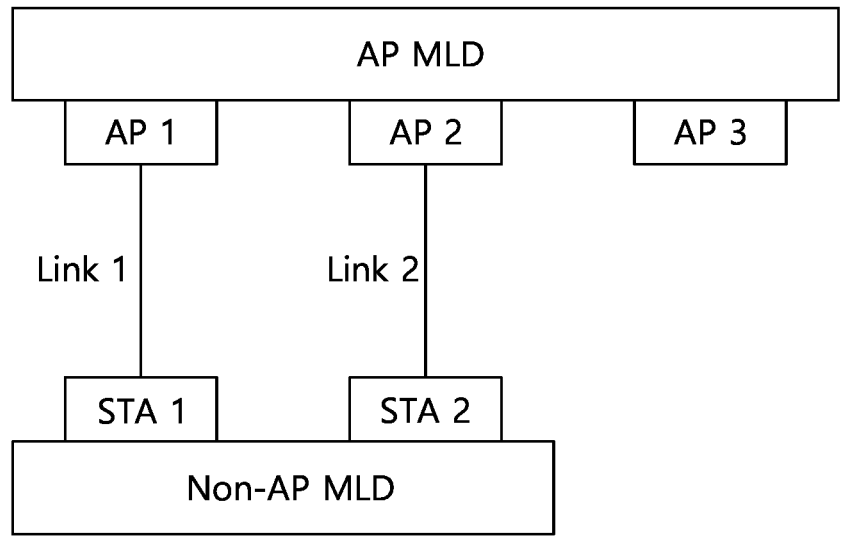
FIG. 16 illustrates an example in which an AP MLD and a non-AP MLD are connected through a link setup process.

FIG. 16 illustrates an example in which an AP MLD and a non-AP MLD are connected through a link setup process.

Referring to FIG. 16, the AP MLD may include AP 1, AP 2, and AP 3. The non-AP MLD may include STA 1 and STA 2. AP 1 and STA 1 may be connected through link 1. AP 2 and STA 2 may be connected through link 2.

For example, AP 1 and STA 1 may be connected through link 1 through a first link setup process. AP 2 and STA 2 may be connected through link 2 through a second link setup process. As another example, an AP MLD and a non-AP MLD may be connected through one link setup process. In other words, an AP MLD and a non-AP MLD may be connected through link 1 and link 2 based on one link setup process.

As described above, each AP and STA may perform frame exchange through a connected link. In addition, information of other APs on a different link or other STAs on a different link may be transmitted/received through one link.

However, after this link setup process, the AP MLD or non-AP MLD may request a link change or reconnection for more efficient frame exchange (for example, load balancing or interference avoiding, and the like) depending on the situation/environment.

An embodiment related to link change or reconnection may be described with reference to FIG. 17.

Figure 17:
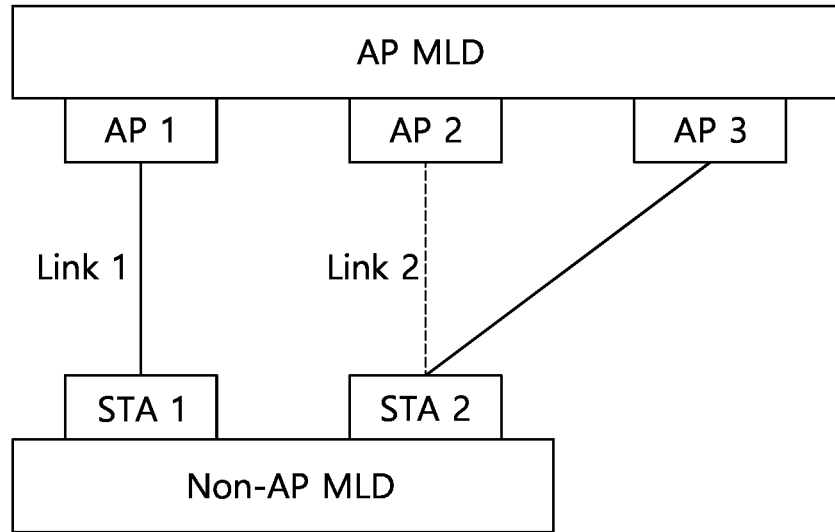
FIG. 17 shows an example in which a link is changed or reconnected.

FIG. 17 shows an example in which a link is changed or reconnected.

Referring to FIG. 17, STA 2 is previously connected to AP 2. Thereafter, the data load of AP 2 may be excessively generated. STA 2 may be reconnected to AP 3 having a relatively small data load. In this case, there is an effect that the AP MLD and the non-AP MLD can perform efficient data exchange.

FIG. 18 shows a specific example in which a link is changed or reconnected.

Referring to FIG. 18, AP 1 of the AP MLD may be connected to STA 1 of the non-AP MLD through link 1. AP 2 of the AP MLD may be connected to STA 2 of the non-AP MLD through link 2. Thereafter, STA 2 may attempt/request a connection with AP 3 through link change or reconnection, and STA 2 may be connected with AP 3 through link 2 based on the link change or reconnection.

According to an embodiment, the non-AP MLD and the AP MLD may request a link transition to improve performance. The AP MLD and the non-AP MLD may transmit/receive/exchange various information for each current link and information on the link state. Accordingly, the AP MLD and the non-AP MLD may select a link more suitable for transmitting and receiving a signal based on various information and link states for each current link, and may transmit the above-mentioned information to help the selection. For example, various information for each current link may include information on data traffic load for each link and channel access capability between links. For example, the link state may be set to disable or enable.

In the following specification, a process in which the AP MLD/non-AP MLD negotiates with the non-AP MLD/AP MLD to request a change or reconnection to a link other than the linked link in order to improve performance may be referred to as "Link switching negotiation". The name of the "Link switching negotiation" may be called variously, and this may be changed.

During the link switching negotiation process, the non-AP MLD (or AP MLD) requests to change a link connected to a specific STA to another link, and to this request, the AP MLD (or non-AP MLD) may respond through a request acceptance or rejection message.

For example, as shown in FIG. 18, when a link change is agreed upon through link switching negotiation, the STA may change the existing link from AP 2 to AP 3 and perform a link re-setup process for reconnection.

Hereinafter, the link change or reconnection process may be divided into a case requested by the AP MLD and a case requested by the non-AP MLD.

An Embodiment in which AP MLD Requests Link Changing or Reconnection

According to an embodiment, the AP MLD may request a link change or reconnection to the non-AP MLD for efficient data transmission. For example, for load balancing, based on the data traffic of each AP, the AP MLD may request the STA to change or reconnect to a more efficient link.

For example, the AP MLD may calculate/verify/determine a link suitable for STAs of the non-AP MLD based on data traffic load information for each AP and/or channel access capability information between each link (for example, information about STR (Simultaneous TX/RX) capability, etc.). Thereafter, the AP MLD may request a link change or reconnection to the STA (or non-AP MLD), based on data traffic load information for each AP and/or channel access capability information between each link.

As described above, when requesting a link change, the AP MLD may transmit link information that it considers most appropriate to the non-AP MLD through a request message. For example, the request message may include a beacon or a management frame.

In relation to the above-described embodiment, an element or field including information on a link considered to be most suitable may be newly proposed. A newly proposed element or field may be defined as a "recommended link". The "recommended link" is an example, and the name of a specific element or field may be changed.

recommend link (element/field): An element or field for the AP MLD to recommend the most suitable link to the STA of the non-AP MLD based on various information for each link (for example, data load for each link, etc.). For example, the recommend link (element/field) may be indicated by Link ID information of AP MLD or AP BSS information. In other words, the recommend link (element/field) may include Link ID information of AP MLD or AP BSS information.

According to an embodiment, the recommend Link (element/field) may be optionally included in a Link Switching Response and transmitted. For example, the STA may establish a connection with a link recommended by the AP based on the element/field (that is, recommend Link). For another example, the STA may perform a connection request to a link different from the indicated link based on the element/field (that is, recommend Link) and additional information it has.

A detailed signal exchange procedure between an AP MLD and a non-AP MLD according to the above-described embodiment may be described with reference to FIG. 19.

Figure 19:
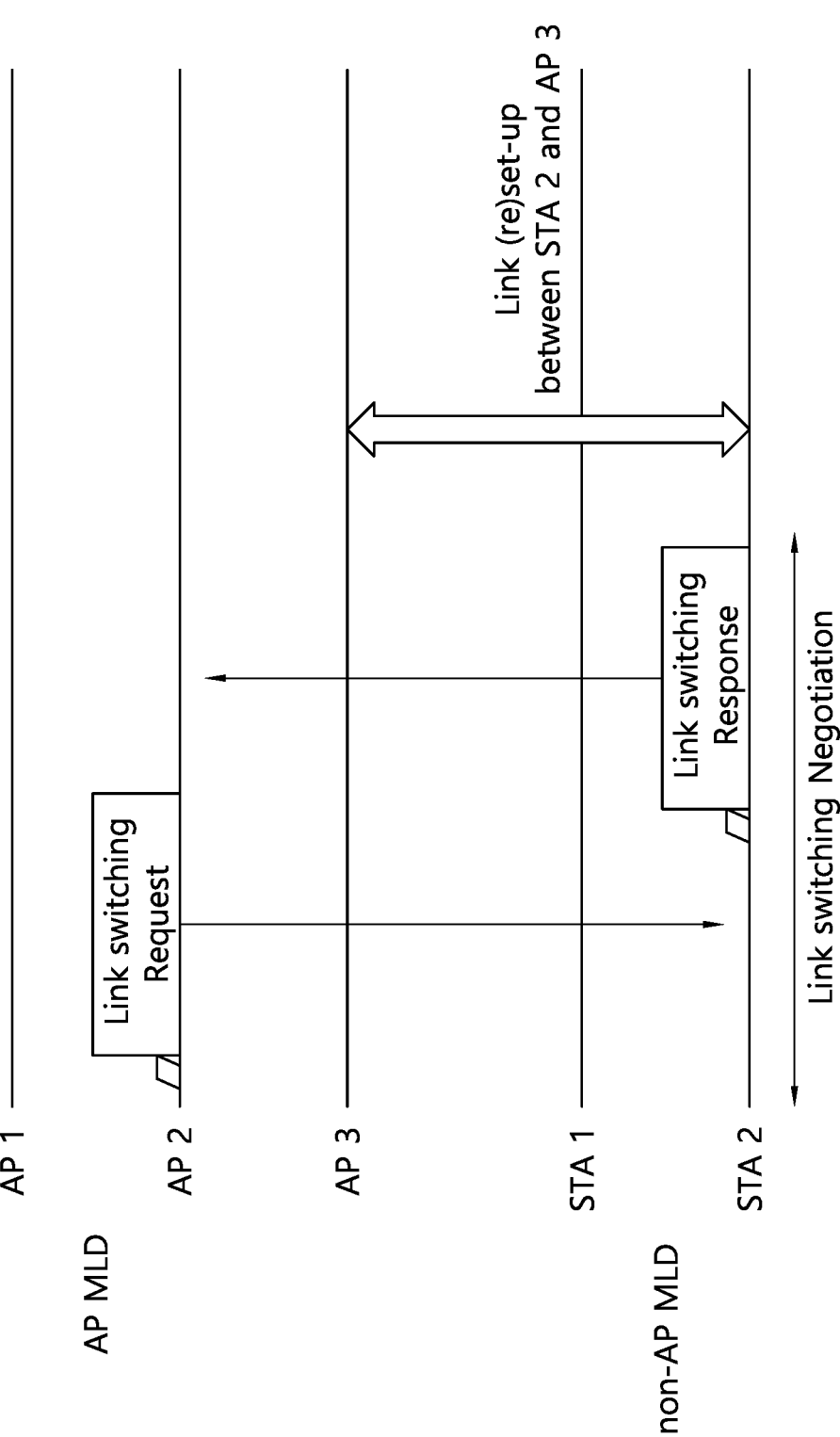
FIG. 19 illustrates operations of an AP MLD and a non-AP MLD for link change or reconnection.

FIG. 19 illustrates operations of an AP MLD and a non-AP MLD for link change or reconnection.

Referring to FIG. 19, in a situation in which STA 2 is connected to AP 2 through link 2, a lot of data traffic may be concentrated in AP 2. In other words, when STA 2 is connected to AP 2 through the link 2, a lot of data traffic may be generated in AP 2.

The AP MLD (or AP 2) may request the non-AP MLD (or STA 2) to reconnect to AP 3, which has relatively few STA connections. In general, the message for requesting reconnection is transmitted to the STA (that is, STA 2) that wants to reconnect, but depending on the situation (for example, channel status or link status), it may be transmitted to any STA (that is, other STA). In other words, based on the channel condition or link condition, the STA to which a request message for requesting reconnection (for example, Link switching request frame) is transmitted may be changed.

For example, when the STA (that is, STA 2) that has received the request message for requesting the reconnection accepts the request, a response message with "Accept" (for example, Link switching response frame) may be transmitted. For another example, when the STA (that is, STA 2) rejects this request, a response message with "Decline" may be transmitted.

In general, the STA that accepts the reconnection (that is, STA 2) may transmit a response message to the existing Link (the link before reconnection), but the response message may be transmitted through any link (that is, another STA) using the multi-link characteristic.

If STA 2 accepts the link reconnection request, after transmitting the response message, STA 2 may disconnect from the existing AP 2 and request link reconnection to AP 3. In this case, the reconnection request process may be performed in the same way as the existing link setup process between MLDs. After the link setup process between AP 3 and STA 2 is completed, STA 2 may perform frame exchange with AP 3 through Link 2.

Conversely, when STA 2 rejects the link reconnection request, STA 2 and AP 2 may use the existing linked link (that is, link 2) as it is.

According to an embodiment, when the AP requests a link change to the STA and a suitable link is recommended, the STA may or may not change the link to the recommended link. For example, the above-described recommend link may be used for the AP to recommend a link suitable for the STA.

For example, the STA may approve the link change as a response message to the request message for requesting reconnection of the AP. The STA may approve/confirm the link change with the recommended link, or may request another link change from the AP based on information other than the information included in the request message.

Accordingly, the AP needs to inform the STA of whether to accept the response message. To this end, the AP may transmit a confirmation message (for example, link switching confirmation frame) for the STA's response message (for example, Link switching Response frame) to the STA.

Specific operations of the AP MLD and the non-AP MLD of the above-described embodiment may be described with reference to FIG. 20.

Figure 20:
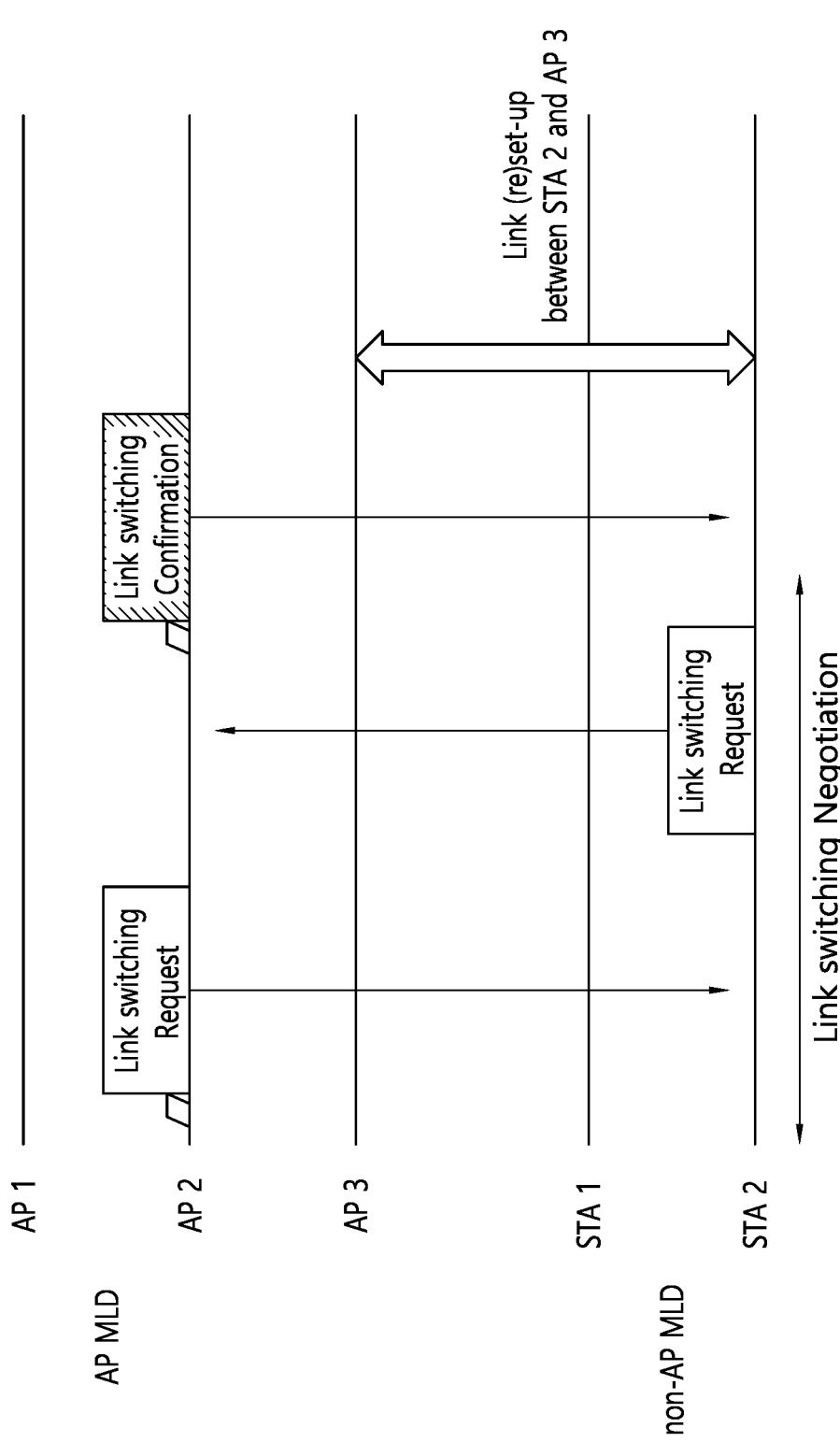
FIG. 20 illustrates the operations of an AP MLD and a non-AP MLD for link change or reconnection.

FIG. 20 illustrates the operations of an AP MLD and a non-AP MLD for link change or reconnection.

Referring to FIG. 20, AP 2 may request a link change to STA 2 by including the recommended link information. In other words, AP 2 may transmit a link switching request frame including the recommended link information to STA 2.

STA 2 may transmit whether to accept the link request through a Link Switching Response frame.

For example, when link switching is accepted, STA 2 may transmit link information to be changed via a link switching response frame. At this time, the link information to be changed may or may not be the same as the recommended link.

For another example, when STA 2 selects a link other than the recommended link provided by AP 2 and responds with a link switching response frame, the AP may transmit a message indicating whether to finally approve the link to the STA. The message may be referred to as a link switching confirmation frame.

For example, AP 2 may accept the link change to the link designated by STA 2 through the Link Switching Confirmation frame. STA 2 may attempt to change a link to a link designated by it, based on the Link Switching Confirmation frame.

As another example, AP 2 may refuse to change the link to the link designated by STA 2 through the Link Switching Confirmation frame. STA 2 and AP 2 may maintain the connection with the previously connected link without changing the link.

The embodiment shown in FIG. 20 may be applied even when the AP transmits the link switching request frame without including the recommended link information. For example, when the AP (for example, AP 2) transmits a link switching request frame to the STA (for example, STA 2) without the recommended link information, the STA may directly designate a link for changing based on the information it possesses, and then respond to the AP through a link switching response frame. Even in this case, the AP must finally transmit a Link Switching Confirmation frame for acknowledgment. Accordingly, an embodiment in which the AP transmits the Link Switching Confirmation frame may be applied even when the recommended link information is not included in the Link switching request frame.

Embodiment in which Non-AP MLD Requests Link Changing or Reconnection

According to an embodiment, the non-AP MLD may request a link change or reconnection to the AP MLD for efficient data transmission. For example, in order to use STR capability during data transmission, the non-AP MLD may request the AP MLD to change or reconnect a connected link.

Figure 21:
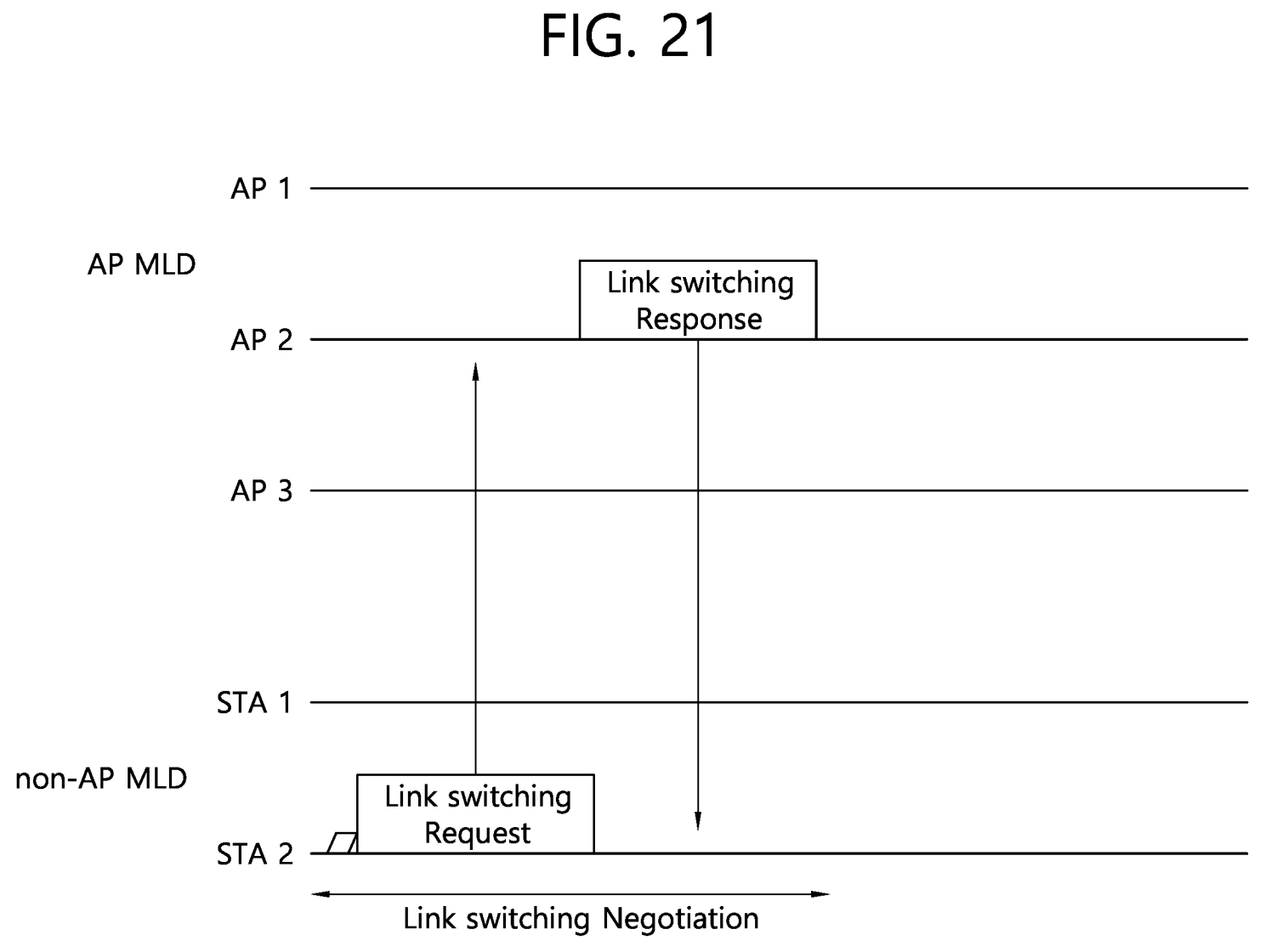

FIG. 21 shows the operations of an AP MLD and a non-AP MLD for link change or reconnection.

Referring to FIG. 21, the AP MLD and the non-AP MLD may perform link switching negotiation. STA 2 of the non-AP MLD may transmit a link switching request frame to AP 2 of the AP MLD. AP 2 of the AP MLD may transmit a link switching response frame to STA 2 of the non-AP MLD in response to the link switching request frame. The link switching request frame or link switching response frame may be transmitted/received through a link to be changed, but is not limited thereto. The link switching request frame or link switching response frame may be transmitted/received through various links as well as the link to be changed.

The non-AP MLD may request link change or reconnection through various methods. Hereinafter, three methods for requesting a link change or reconnection by a non-AP MLD may be proposed. Specifically, the three methods may be sequentially described as a Solicited method, an Unsolicited method, and a General method.

1) Solicited method: A method in which the non-AP MLD requests various information of APs included in the AP MLD to the AP MLD and receives various information through this. For example, various pieces of information may include information about capability, operation element, and BSS parameters.

According to an embodiment, the method for the STA to request information on other APs of the connected AP MLD may be used in various cases as well as when reconfiguring a link. For example, after multi-link setup, the STA may request BSS parameter information of other APs for link switching and select the best link based on the received information. Alternatively, in the discovery process, the STA may request the AP MLD for BSS load information of each AP, and select a link to perform link setup based on the received information. (However, it is assumed that the number of APs in the AP MLD is greater than the number of STAs in the non-AP MLD.)

Accordingly, the AP receiving the information request message may transmit any information such as capability information, BSS parameter information, critical parameters, and/or operation element information for all APs in the AP MLD. All of the above-described examples may be applied to the embodiments described below.

2) Unsolicited method: A method in which the AP transmits various information without a separate information request of the non-AP MLD. The STA may utilize the received information in various situations. According to an embodiment, a method for an AP of an AP MLD to transmit information on other APs without a separate request for information from a STA may be used in various cases as well as case of reconfiguring a link. Accordingly, the AP receiving the information request message may transmit any information such as capability information, BSS parameter information, critical parameters, and/or operation element information for all APs in the AP MLD. All of the above-described examples may be applied to the embodiments described below.

3) General method: A method in which non-AP MLD requests link (re) selection without additional information based on information acquired through previous Beacon frame, and the like.

1) Solicited Method

Hereinafter, an embodiment of the above-described solicited method may be described.

According to an embodiment, the non-AP MLD may request information for selecting a suitable link to the AP MLD before link change or reconnection. In order to select an appropriate link, the STA may utilize data load information for each AP or capability information of each link (or information on other links).

For example, the capability information for each link may be included in a beacon frame and transmitted periodically.

For another example, the capability information for each link may be optional information, and may not be included in the Beacon frame transmitted every cycle. Alternatively, in order to reduce frame overhead, only information of a link to which a STA is connected or a part of an associated link may be received. Alternatively, if the beacon reception period is long due to the characteristics of the non-AP MLD (for example, a low-power device), the non-AP MLD may not receive capability information for each link for a more suitable link selection.

In the above-described cases, the non-AP MLD may request the latest information of capability information for each link and information for each link of the AP MLD (for example, BSS parameter information or operation element information, and the like). The link of the capability information for each link and the information for each link may include other links as well as the links for transmitting/receiving. For example, a field of a QoS data frame (A-Control field of 11ax standard), a management frame, a Probe response/request frame, a PS-Poll frame, or a Null frame may be used to request/transmit the latest information. Alternatively, a separate new frame may be defined in order to request/transmit the latest information.

According to an embodiment, in order to request the latest information on the capability information for each link and the information for each link of the AP MLD, the STA may transmit a request message for requesting information necessary for link reselection to the AP. For example, a probe request frame previously defined for the request message may be reused. As another example, a new frame for the request message may be defined.

According to an embodiment, through the request message, the STA may request the AP with designating necessary specific information. Specific information that can be designated may be changed according to circumstances. That is, the STA may request only information corresponding to a specific link or only information corresponding to a specific capability. For example, the information corresponding to the specific link may include information about the BSS load/parameters of the specific link. In addition, the information corresponding to the capability may include BSS load information of all links or BSS load information of a specific link. In this case, the AP may transmit only information designated by the STA through the response message. A specific embodiment related to a specific information request and response may be described through an embodiment related to IOM definition and operation.

As another example, the STA may request all capability information (for example, other link information) currently possessed by the AP MLD through the request message.

As in the above example, an embodiment for transmitting all information possessed by the AP or an embodiment for transmitting only specific information designated by the STA may be defined/configured in various ways. For example, the AP may transmit all information or designated information based on a separate field or bitmap to indicate (or transmit) only specific information.

In general, a message requesting information to the AP MLD may be transmitted through a STA that wants to reconnect, but may be transmitted to any STA (that is, other STA) depending on the situation (channel status or link status).

Upon receiving the request message, the AP MLD may transmit a response message (that is, an information message) including information requested by the STA (for example, data load information for each link, STR capability information between links, and the like) to the non-AP MLD. For example, when a conventional probe request frame is reused for the request message, the AP (or AP MLD) must respond using a probe response frame as the response message.

The response message may also be generally transmitted through the AP that has received the request message, but may also be transmitted to any AP (that is, other AP) using the multi-link characteristic.

Optionally, the AP MLD may transmit a "recommend link" element that recommends a link suitable for the STA through a response message including the above-described various pieces of information (for example, the latest information required for link reselection).

The above-described solicited method may be used for link change or reconnection in the STA of a non-AP MLD. For example, when a non-AP MLD STA wants link reselection due to link congestion, the STA of the non-AP MLD may request BSS load information and BSS parameter information for each link of the connected AP MLD through the solicited method. Upon receiving the request message, the AP may transmit the link and information indicated by the STA in a response message.

Hereinafter, the above-described request message and response message may be described as an information request message and an information response message, in order to distinguish them from the request message for link change and the response message for link change.

Based on the information included in the above-described information response message, the STA may reselect an appropriate link and request the AP MLD to change or reconnect the link through a link change request message. The request message for link change may include AP information to be reconnected and link information.

Upon receiving the request message, the AP MLD may transmit a response message of "Accept" when accepting the request. When the AP MLD rejects the request, it may transmit a response message of "decline".

If the request is accepted, the AP may perform Link (re) setup after transmitting the response message, based on the frame exchange through the link of the reselected AP. Conversely, if the request is rejected, the STA may use the existing linked link as it is.

A specific example for operations of an AP MLD and a non-AP MLD according to the solicited method may be described with reference to FIG. 22.

Figure 22:
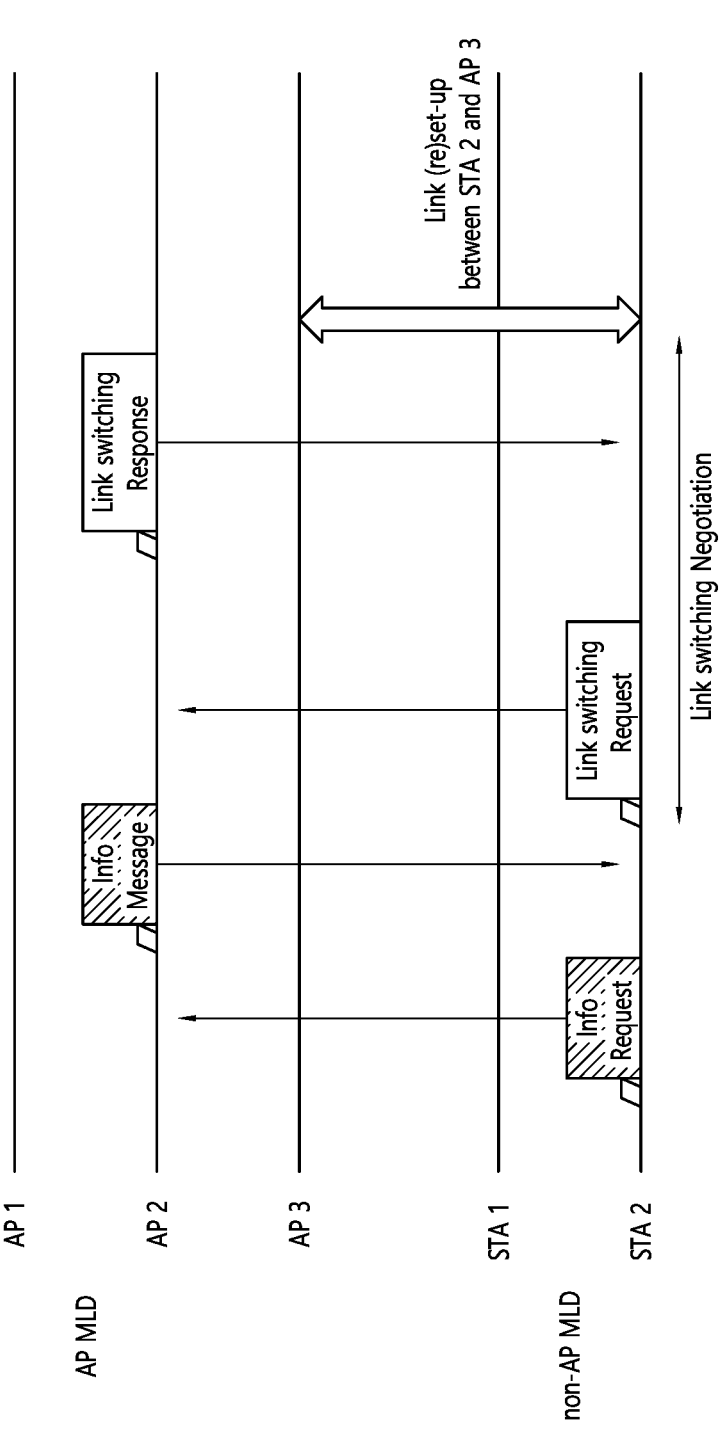
FIG. 22 illustrates the operations of an AP MLD and a non-AP MLD for link change or reconnection.

FIG. 22 illustrates the operations of an AP MLD and a non-AP MLD for link change or reconnection.

Referring to FIG. 22, when STA 2 of the non-AP MLD wants to reselect a connected link, STA 2 may transmit an info request message to the AP MLD through Link 2. Upon receiving this, the AP MLD may transmit an info response message including information necessary for link reselection of the non-AP MLD. Based on the information included in the above-described info response message, STA 2 of the non-AP MLD may transmit a link change request message (that is, a link switching request frame) to AP 2 of the AP MLD. Thereafter, STA 2 may receive a response message for link change (that is, link switching request frame) and perform link (re) set-up for link change.

The embodiment for requesting information proposed in this specification may be used/applied even when the STA requests necessary information to the AP. When information included in a frame (for example, beacon) received by the STA from the AP is insufficient, the STA may request the AP for insufficient information. For example, when the AP transmits only information on a linked link without including information on other links or only information on whether information on other links is updated, the STA may request the AP for insufficient information.

A specific example of the above embodiment may be described with reference to FIG. 23.

Figure 23:
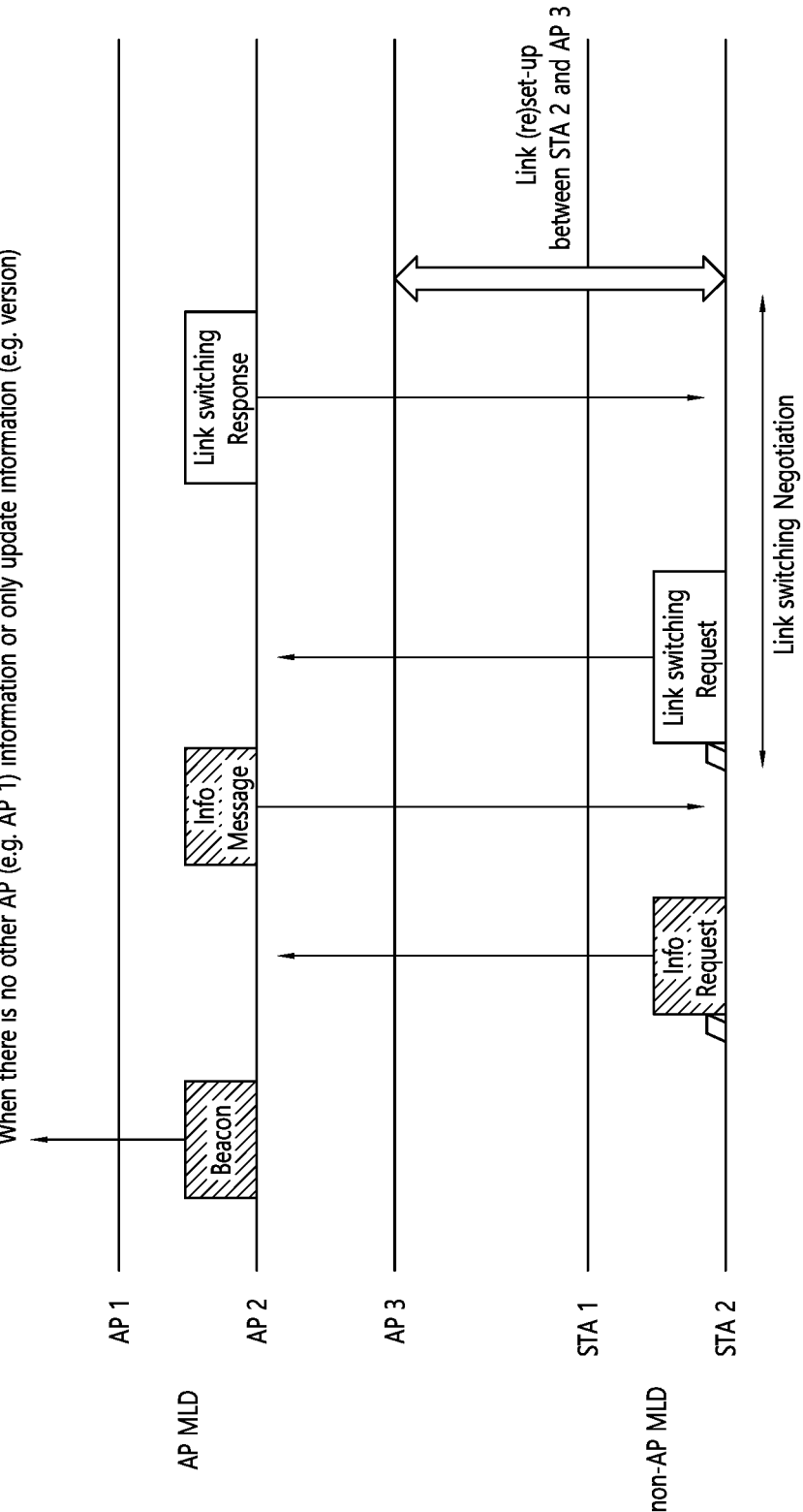
FIG. 23 illustrates an operation of a non-AP MLD for requesting information on other APs.

FIG. 23 illustrates an operation of a non-AP MLD for requesting information on other APs.

Referring to FIG. 23, the AP MLD (or AP 1 to AP 3) may transmit only information regarding whether the information is updated by other APs (that is, link) to the STA through a beacon frame. Accordingly, STA 2 may transmit an Info request message (or Info request frame) to AP 2. STA 2 may receive an Info response message (or Info message) based on the Info request message. STA 2 may receive/obtain information about other APs based on the Info response message.

For example, information on whether other AP information of the AP MLD (for example, BSS load information, and the like) may not be included in the Beacon, or whether AP 2 has updated other AP information (for example, version/update version) can only be transmitted.

STA 2 may need the information of AP 1 (or information about AP 1). STA 2 may request necessary information through AP 2. STA 2 may acquire information of AP 1 through a response message to the request. STA 2 may use the information of AP 1 to reselect an appropriate link for link switching. For example, a frame for link switching may be set in various ways.

Additionally, the above-described solicited method may be used for the STA to acquire information on APs possessed by the AP MLD even before multi-link setup. In the multi-link setup process of a Non-AP MLD and an AP MLD, when the number of APs in the AP MLD is greater than the number of STAs in the non-AP MLD, STAs of the non-AP MLD need to decide which AP of AP MLD to establish a link with. In this case, the STA of the non-AP MLD may request specific information for each link (for example, BSS load information of APs possessed by AP MLD, and the like) to know the state of each link to the AP of the AP MLD before the multi-link setup. As an example, the STA may use a probe request as a request message. As another example, a new frame for the request message may be defined. The STA may transmit a request message including an indicator for requesting a specific element (for example, a Request element or an Extended Request element or a PV1 Probe Response Option element, and the like) and an indicator for indicating specific link information (for example, Link ID, and the like).

For example, the STA of the non-AP MLD may transmit a request message including an instruction for requesting current BSS load information for all APs in the AP MLD to be connected. Upon receiving the request message, the AP may transmit necessary information (BSS load information of all APs in the AP MLD to which the AP is connected) via a response message based on the STA's instruction to the STA. In this case, the STA, which has checked the BSS load information for each AP, may select links to be connected in the order of the BSSs (that is, APs) having the lowest BSS load. The STA may indicate the selected link during multi-link setup. In other words, information on a link selected during multi-link setup may be transmitted to the AP.

In this way, the STA may use the solicited method as a method for acquiring information for each AP of the AP MLD in order to select a link to be connected before multi-link setup.

Hereinafter, a new element/field including information for a STA of a non-AP MLD to select a suitable Link may be proposed.

For example, "STA ratio per Link" (element/field) may be proposed. "STA ratio per Link" may include information on the ratio of the number of STAs connected per Link. A specific example may be described with reference to FIG. 24.

Figure 24:
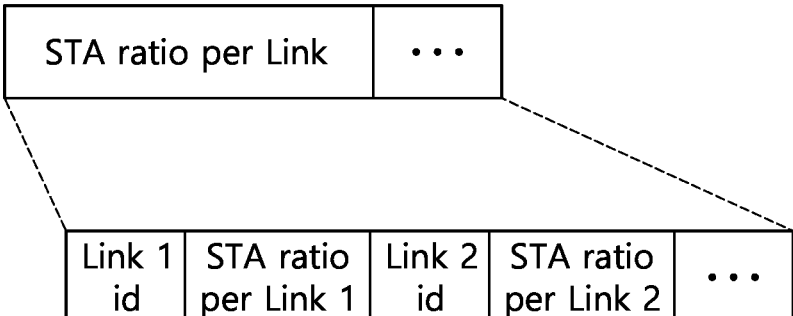
FIG. 24 shows a specific example of STA ratio per Link.

FIG. 24 shows a specific example of STA ratio per Link.

Referring to FIG. 24, the STA ratio per Link (element/field) may include information on the number or ratio of STAs connected to each Link in the entire AP MLD.

For example, if a total of 50 STAs are connected to an AP MLD having 3 links, 10 STAs may be connected to Link 1 and 20 STAs may be connected to Link 2. The AP MLD may transmit information on a value or ratio (%) of information on a STA connected for each link to the non-AP MLD through STA ratio per Link (element/field).

For example, when information on a STA connected for each Link is expressed as a value, Link 1 may be expressed/set as 10 and Link 2 as 20. Accordingly, the value of STA ratio per link 1 may be set to 10. Also, the value of STA ratio per link 2 may be set to 20.

As another example, when information on a STA connected for each Link is expressed as a ratio, Link 1 may be expressed/set as 20 ($^{10}/_{50}$) % and Link 2 as 40 ($^{20}/_{50}$) %. Accordingly, the value of STA ratio per link 1 may be set to 20. Also, the value of STA ratio per link 2 may be set to 40.

The above-described example is illustrative, and information on the STA connected for each Link may be set in various ways. In addition to the above-described example, information on a STA connected for each Link may be set as a relative value.

Based on the above-described information on the STAs connected for each link, the STA can check/obtain the number and ratio of STAs connected for each link, and use this as information for link selection.

According to an embodiment, in addition to the above-described "STA ratio per Link" (element/field), various information/element/field may be included in the information response message. For example, the following information/element/field may be included in the information response message.

BSS load information for each AP

STR Capability information between Links

TXOP information for each Link

NAV information for each link

Recommended Link information (that is, "recommend Link" element)

information on connected STA ratio per Link (that is, "STA ratio per Link" element)

etc.

In addition to the above-described information/element/field, various information necessary for link selection may be included in the information response message and transmitted.

After receiving the information as in the above example, the STA may select an AP to be changed or reconnected based on the received information, and then, may transmit a request message for requesting reconnection of the link. Upon receiving the request message, the AP MLD may transmit a response message of "Accept" when accepting the request. When the AP MLD rejects the request, it may transmit a response message of "Decision".

If the request is accepted, the AP can perform frame exchange through the link with the reselected AP after sending the response message. Conversely, in case of rejection, the STA can use the existing connected Link as it is.

2) Unsolicited Method

Unlike the solicited method in which the non-AP MLD directly requests additional information, according to the unsolicited method, the AP MLD can transmit additional information to the non-AP MLD through a beacon frame or a separate frame (For example, a field of QoS data frame (A-Control field of 11ax standard), a management frame, an FILS discovery frame, an unsolicited Probe response frame, a PS-Poll frame or a Null frame, and the like) without requesting additional information from the non-AP MLD. As another example, a new frame may be defined as a frame for transmitting additional information to the non-AP MLD.

For example, if the beacon period is rather long, the non-AP MLD may lack essential information required for link switching or may not be up-to-date. Accordingly, the AP may transmit a frame including link capability information of the AP MLD to the non-AP MLD. Thereafter, the non-AP STA may acquire the latest information on the capability of each link of the AP MLD. The frame may be transmitted periodically or may be transmitted aperiodically.

For example, when the frame is transmitted periodically, the AP may transmit the frame to share the latest information of the AP at regular time intervals. In this case, the time interval should be shorter than the Beacon period transmitted by the AP. Also, when a FILS Discovery frame is used as the frame, the frame may be transmitted every 20 µs. As another example, a period agreed upon by the AP and the STA through capability negotiation may be used. For example, the transmission period may be indicated through the "periodic" field and the "interval" field/subfield value of the IOM capability element.

As another example, when the frame is transmitted aperiodically, the AP may transmit the frame whenever an event for updating information (capability, BSS parameter, operation element) of the AP occurs. As a specific example, the changed information may be transmitted to the connected STA whenever the link capability of the AP of the AP MLD is changed. In this case, the STA may maintain the latest information on link capability.

According to the above-described example, since the non-AP STA does not transmit a request message for acquiring a separate link capability, there is an effect that the frame exchange overhead is relatively small compared to the solicited method. In addition, since the STA can receive the updated information whenever the main information is updated, there is an effect that the STA can use the received information usefully.

An example of the specific operation of an AP MLD and a non-AP MLD according to the unsolicited method may be described with reference to FIG. 25.

Figure 25:
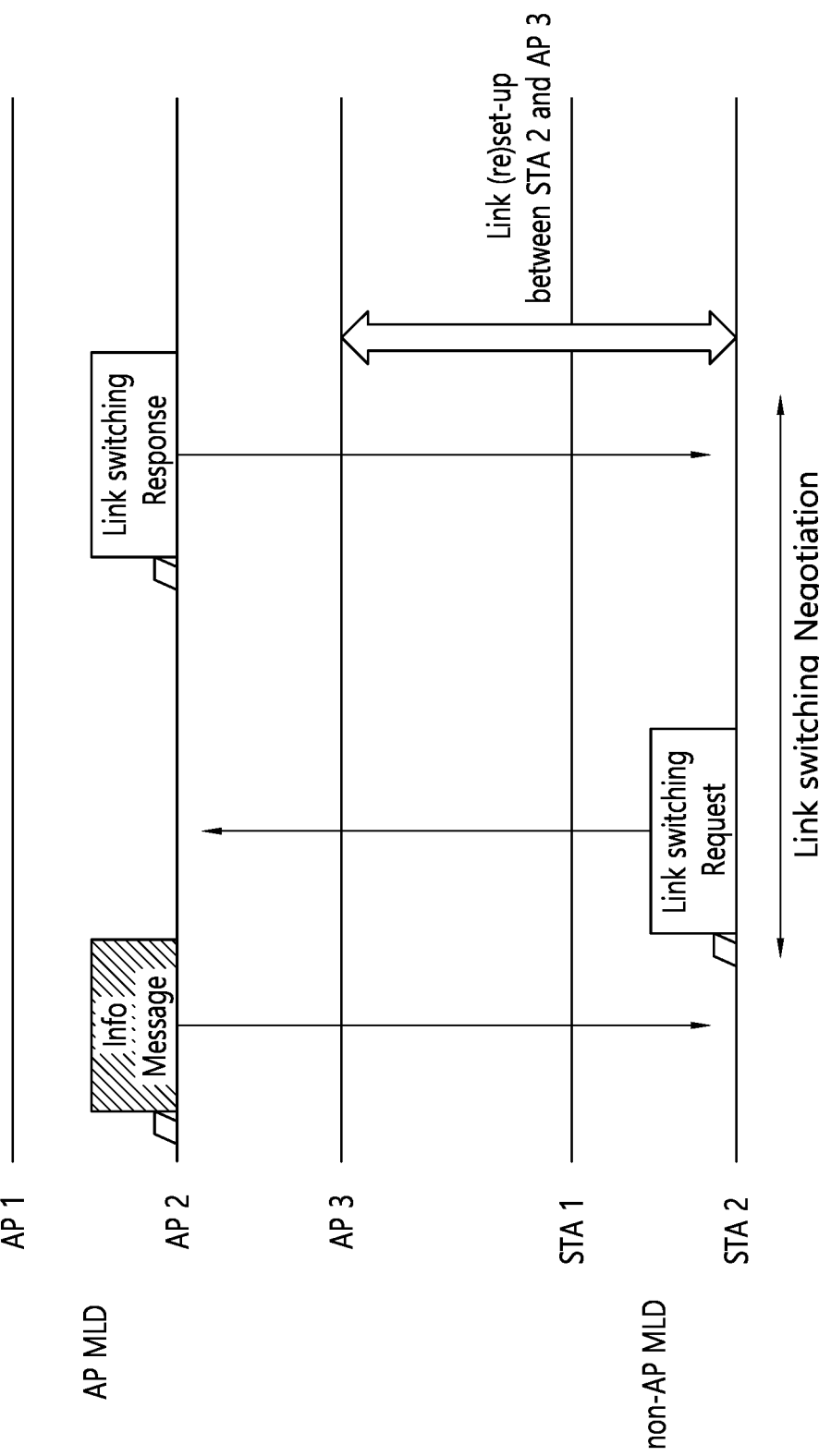
FIG. 25 shows the operations of an AP MLD and a non-AP MLD for link change or reconnection.

FIG. 25 shows the operations of an AP MLD and a non-AP MLD for link change or reconnection.

Referring to FIG. 25, the AP MLD may transmit essential information necessary for link reselection to the non-AP in a separate frame (for example, Info message) without a separate request message from the non-AP MLD.

According to an embodiment, unlike FIG. 32, the AP MLD may transmit link capability information to the STA through a field of a DL frame (e.g. a QoS data frame) that it transmits to the non-AP MLD without a separate request message from the non-AP MLD. Operations of the AP MLD and the non-AP MLD according to the above embodiment may be described with reference to FIG. 26.

Figure 26:
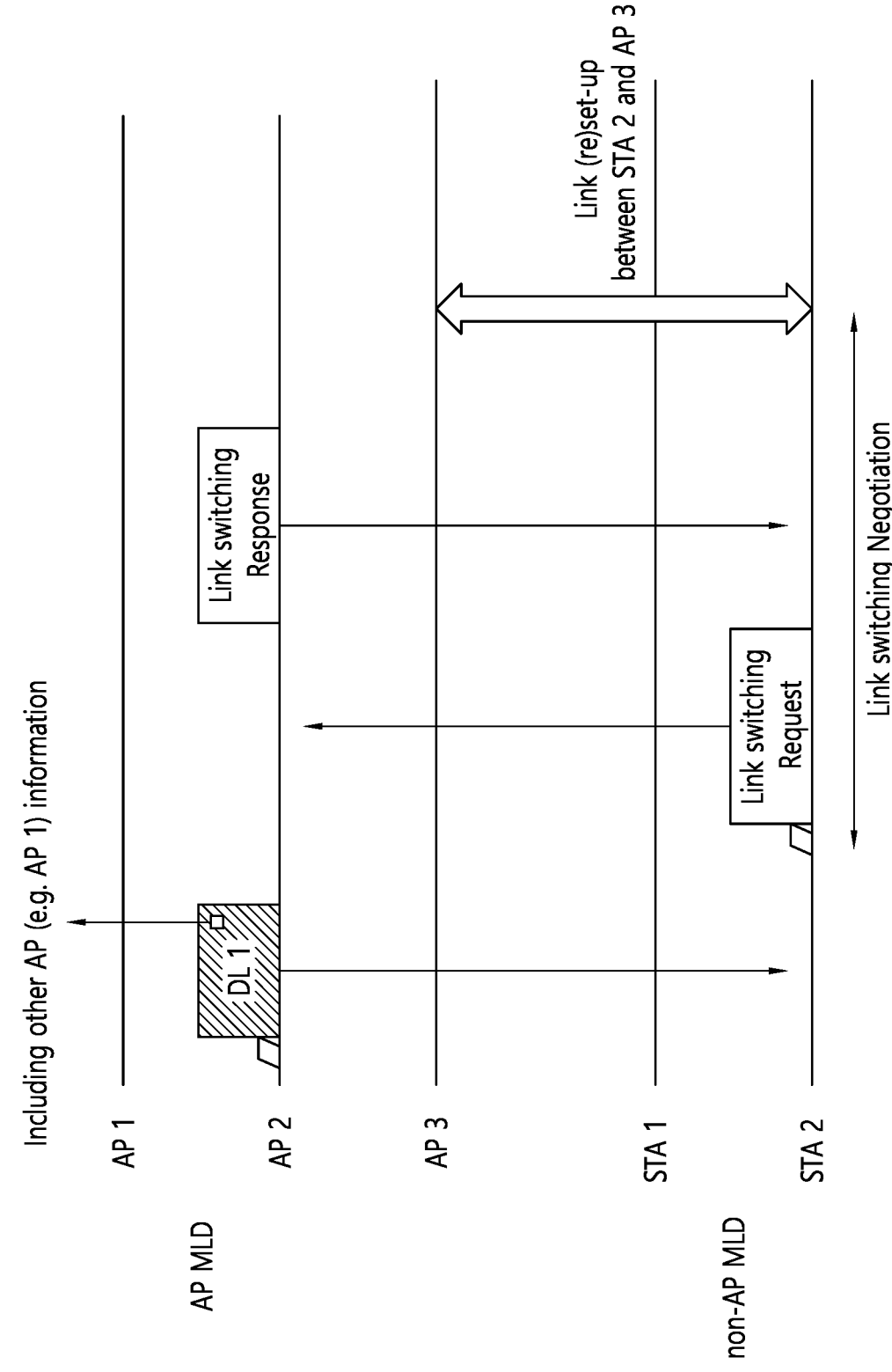
FIG. 26 shows the operations of an AP MLD and a non-AP MLD for link change or reconnection.

FIG. 26 shows the operations of an AP MLD and a non-AP MLD for link change or reconnection.

Referring to FIG. 26, AP 2 may transmit information of the other AP (or information about the other AP) to STA 2 based on a DL frame (that is, DL 1). In other words, the DL frame may include information about other APs. For example, information about other APs may be included in an A-Control field of the 802.11ax standard. According to the above embodiment, since the existing DL frame is used without a separate message, frame overhead can be reduced. If the critical information of other APs is changed and real-time information is required, update information may be transmitted through a separate message as in the embodiment of FIG. 26.

For example, the critical information of the AP may include the following A to Q.

A. Inclusion of a Channel Switch Announcement element

B. Inclusion of an Extended Channel Switch Announcement element

C. Modification of the EDCA parameters element

D. Inclusion of a Quiet element

E. Modification of the DSSS Parameter Set

F. Modification of the CF Parameter Set element

G. Modification of the HT Operation element

H. Inclusion of a Wide Bandwidth Channel Switch element

I. Inclusion of a Channel Switch Wrapper element

J. Inclusion of an Operating Mode Notification element

K. Inclusion of a Quiet Channel element

L. Modification of the VHT Operation element

M. Modification of the HE Operation element

N. Insertion of a Broadcast TWT element

O. Inclusion of the BSS Color Change Announcement element

P. Modification of the MU EDCA Parameter Set element

Q. Modification of the Spatial Reuse Parameter Set element

Therefore, the non-AP MLD can acquire the latest link capability information regardless of the beacon frame period. The non-AP MLD may select an appropriate link during link switching based on the received information. Based on the received information, the STA may reselect an appropriate link and request the AP MLD to change or reconnect the link. The request message may include information on the AP to be reconnected and link information. In addition, the AP MLD receiving this message may transmit a response message of "Accept" when accepting the request, and may transmit a response message of "Decline" when rejecting the request.

If the request is accepted, the AP can perform link (re) setup through frame exchange with the reselected AP's link after sending the response message. Conversely, in case of rejection, the STA can use the existing connected Link as it is.

3) General Method

According to the general method, a non-AP MLD can request a link change or reconnection without requesting additional information based on the information it currently possesses. The information used at this time may include information on the AP MLD and information on the non-AP MLD (for example, STR Capability information for each Link, link state (enable/disable) information, and the like) included in a previously received beacon or a management frame.

Unlike the solicited method, the STA may directly transmit a link change or reconnection request message to the AP MLD without a separate request for information to the AP MLD. The request message may include information on the AP and information on the link to be reconnected. Upon receiving the request message, the AP MLD may transmit a response message of "Accept" when accepting the request, and transmit a response message of "Decline" when rejecting the request.

If the request is accepted, the AP can perform frame exchange through the link with the reselected AP after sending the response message. Conversely, in case of rejection, the STA can use the existing connected Link as it is.

An example for specific operations of an AP MLD and a non-AP MLD according to the general method may be described with reference to FIG. 27.

Figure 27:
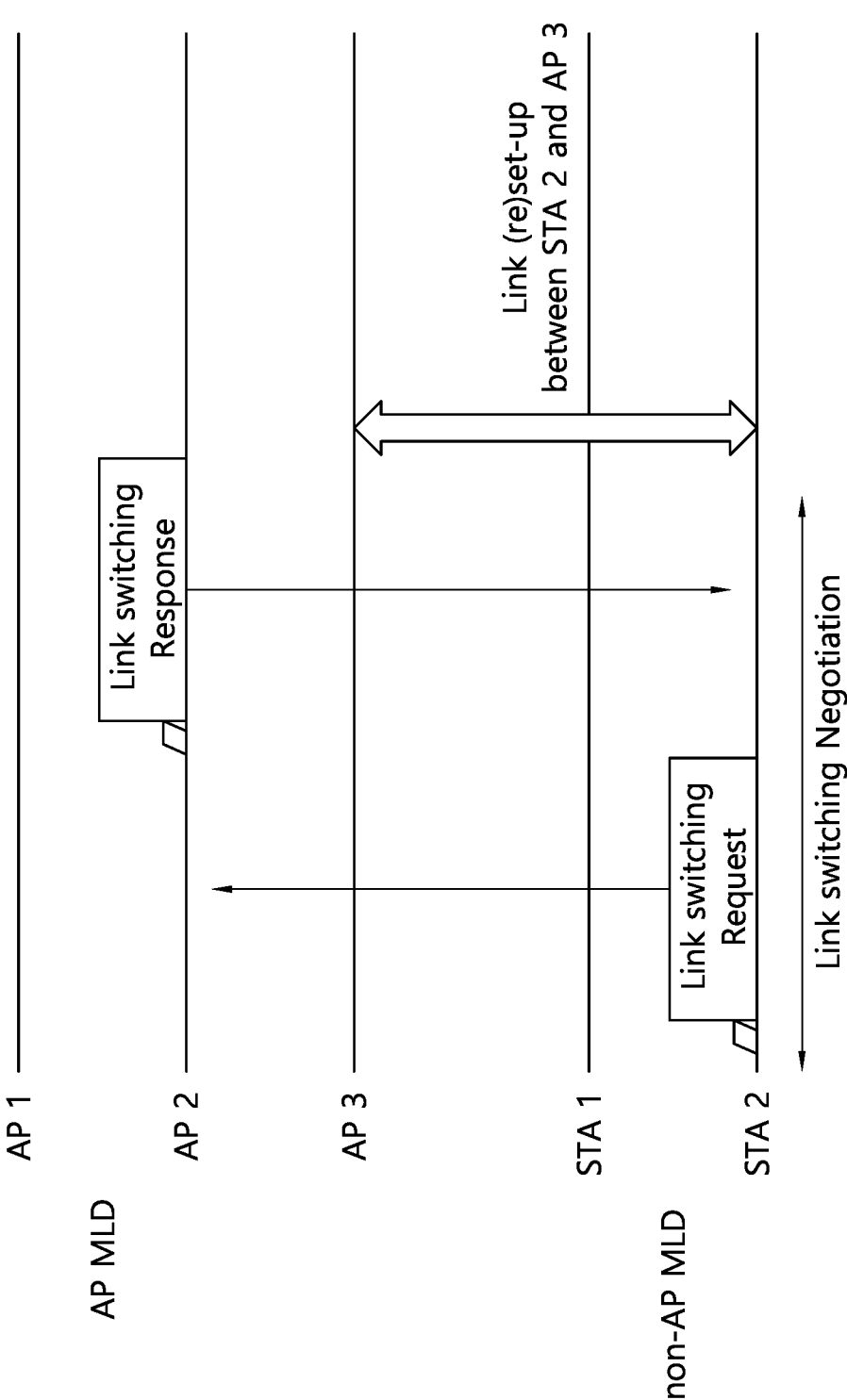
FIG. 27 illustrates the operations of an AP MLD and a non-AP MLD for link change or reconnection.

FIG. 27 illustrates the operations of an AP MLD and a non-AP MLD for link change or reconnection.

Referring to FIG. 27, STA 2 may want to directly change the link in order to guarantee QoS. If STA 2 has previously received information from AP MLD (for example, information received through Beacon frame or Management frame, etc.) or has already determined the link it wants to reconnect, STA 2 may request a link change or reconnection without a separate request for information.

STA 2 may transmit STA information (e.g. STA ID, etc.) and link information to be changed (e.g. Link ID or AP BSS information, etc.) in the Link switching request frame. Upon receiving the change, the AP MLD may transmit a Link switching response frame of "acknowledgment" to the STA 3 through the existing Link 2 when accepting the change. Thereafter, STA 2 of the non-AP MLD may be reconnected to the AP 3 after performing a link (re) setup process.

Signaling to Indicate Link Change and Reconnection Method

In order to indicate the methods proposed above, a mutual agreement process may be required through negotiation between the AP MLD and the non-AP MLD. For this, in the following specification, a signaling method for enabling the methods to be proposed may be proposed.

First, in order to indicate the method proposed above, a new element may be proposed. Hereinafter, an embodiment related to signaling for indicating a link change and reconnection method will be described. However, the above embodiment may also be applied to an embodiment related to signaling for indicating an anchored link change and reconnection method.

The signaling process for indicating the link change and reconnection method may be performed during multi-link setup or after multi-link setup. In addition, new elements proposed below may be used in a signaling process for indicating a link change and reconnection method. For example, the elements may be included in a (re) association frame of a conventional standard or a new frame.

IOM (Information Obtain Method) Capability Element

The IOM Capability Element may include information on whether to enable the additional information acquisition method for multi-link. For example, an IOM capability value may exist in an element in a message in the process where the AP MLD and the non-AP MLD exchange a message for an operation agreement (for example, a capability negotiation process) in the multi-link setup process. The presence of an IOM capability value in the element in the message may mean that IOM capability is supported.

According to an embodiment, when the AP MLD supports the IOM capability, the AP may internally share information of the Other AP and may have information of the Other AP. MLD in which other AP's information is not shared cannot support IOM capability.

According to an embodiment, when the value of the IOM capability element is set to a first value (for example, 1), the IOM capability element may mean activating the IOM and operating with the indicated function. Conversely, when the value of the IOM capability element is set to a second value (for example, 0), the IOM capability element may mean the deactivation of the IOM.

According to an embodiment, the IOM capability element may include various fields/elements to indicate various operations. For example, the IOM capability element may include various fields/elements described below. However, a field/element added to the IOM capability element may be set differently according to a case in which the AP MLD requests a link change and a case in which the non-AP MLD requests a link change. Also, at least some of fields/elements added to the IOM capability element may be omitted. For example, a field/element including information that does not need to be indicated among fields/elements added to the IOM capability element may be omitted.

Hereinafter, examples of various fields/elements defined/configured to obtain additional information on multi-links may be described. Various fields/elements described below may be independently configured or two or more fields/elements may be combined and transmitted through various frames. For example, various fields/elements described below may be included in other elements to perform a defining operation. As another example, various fields/elements described below may be used by being added to other elements as individual elements or as independent fields.

Method Type (or Method) Field/Element

Method type field/element (hereinafter, Method field/element) may include information on an operation method of the IOM. In other words, the Method field/element may indicate an operation method of the IOM. For example, when the Non-AP MLD activates the IOM method to obtain information from the AP, a non-AP MLD may indicate by selecting a method to be used from among the methods proposed above (for example, a Solicited method, an Unsolicited method, a General method).

As an example, based on the value of the Method field/element being the first value (for example, 0), the Solicited method may be indicated/used. Based on the value of the Method field/element being the second value (for example, 1), the Unsolicited method may be indicated/used. Based on the value of the Method field/element being a third value (for example, 2), the General method may be indicated/used. Based on the value of the method field/element being a fourth value (for example, 3), both the solicited method and the unsolicited method may be indicated/used.

As another example, 1 bit may be used as the method field/element. In this case, based on the value of the Method field/element being the first value (for example, 0) (for example, 0), the Solicited method may be indicated/used. Based on the value of the Method field/element being the second value (for example, 1), the Unsolicited method may be indicated/used.

As another example, 2 bits may be used as the method field/element. In this case, single use or overlapping use for each method may be indicated.

Link Range Field/Element

When the non-AP MLD requests information from the AP MLD, the non-AP MLD may indicate the requested link range through a link range field/element. The Link range field/element may include information on whether the STA wants to request information on all links in the AP MLD or information on some links in the AP MLD.

For example, when the value of the link range field/element is a first value (for example, 0), the link range field/element may mean that information on all links in the AP MLD is requested. When the value of the link range field/element is a second value (for example, 1), the link range field/element may mean that information on some links in the AP MLD is requested.

In this case, when the value of the link range field/element is the first value (for example, 0), since it is a request for all links in the AP MLD, a separate link indication (e.g. "Link condition" field) information is not required. On the contrary, when the value of the link range field/element is a second value (for example, 1), since information is requested for some links in the AP MLD, link indicator information is required.

Info Range Field/Element

The information range field may be used to indicate the range of information, when the non-AP MLD requests information.

For example, when the value of the information range field is a first value (for example, 0), the information range field may indicate that only some information possessed by the AP is provided. When the value of the information range field is a second value (for example, 1), the information range field may indicate that all information (or all information) possessed by the AP is provided.

According to an embodiment, an information range field may be defined to indicate a request for all or part of the information (element) possessed by the AP, but the STA may request more detailed information through an additional subfield. For example, a subfield for indicating a range of information to be provided (for example, all information or partial information) may be included in the information range field. For example, a subfield for indicating a range of information to be provided may be defined/set as an all/partial subfield.

According to an embodiment, a subfield for indicating whether to receive all information or only changed information among all the information may be newly proposed. In other words, the newly proposed subfield may indicate whether to receive all information or only changed information among all the information.

For example, a subfield for indicating whether to receive all information or whether to receive only changed information among all the information may be defined/set as an only updated subfield.

When the STA wants to receive only changed information, the value of only updated subfield may be set to 1. In other words, when the STA wants to receive only changed information, the STA may set the value of the only updated subfield to 1. For example, when the value of the only updated subfield is set to 1, according to the solicited method, when the STA requests information, the AP (or AP MLD) may transmit only changed information (that is, updated information) among the requested information. For another example, when the value of the only updated subfield is set to 1, according to the unsolicited method, the AP may notify only changed information in the information range configured by the STA.

According to the above example, in order to receive only the changed information, only the updated subfield in the Info range field is proposed, but the present disclosure is not limited thereto. In order to receive only the changed information, a separate field or element may be defined/configured.

According to the above-described embodiment, the range of information that the STA can request may be set to updated information or all information. In this case, the STA that does not want a lot of frame overhead may request to receive only the changed information. Accordingly, there is an effect of reducing the overhead.

Link Condition Field/Element

A link condition field may be used to indicate a specific link request. In other words, the link condition field may include information about a specific link requested. The link condition field may be used when the STA wishes to receive only specific link information from the AP.

The link condition field may be indicated by a link identifier (e.g. Link ID, BSS ID). In other words, the link condition field may include information about a link identifier (e.g. Link ID, BSS ID). In other words, a link identifier may be used to specify a link for obtaining information.

For example, if the STA connected to Link 1 wants to request only information on Link 2 and Link 3 from the AP, the STA may request information on Link 2 and Link 3 to the AP by indicating link 2 and link 3 in the link condition field. For example, when the value of the above-described info range field is 1, all information corresponding to link 2 and link 3 may be transmitted. As another example, when the value of the above-described info range field is 0, some information designated by the STA may be transmitted in link 2 and link 3. According to an embodiment, some information designated by the STA may be determined through the following Info condition field.

According to an embodiment, when the value of the link condition field is not present or is 0, the AP may determine that there is no link condition. Accordingly, the AP may provide/transmit information on all links to the STA.

Info Condition Field/Element

An Info condition field may be used to indicate a specific type of the requested information. In other words, the Info condition field may be used when the STA wants to receive only specific information from the AP.

For example, the information condition field can be used only when the info range field is set to 0. As another example, the information condition field may be used by the STA to indicate specific information even when there is no info range field.

For example, in the information condition field, information that can be designated by the STA (e.g. BSS Load, STR Capability, and the like) may be indicated as a bitmap. For example, the type of information provided by the AP and the instruction method or order in the bit may be set in various ways.

According to an embodiment, the information condition field may be used together with the link condition field described above. According to an embodiment, the information condition field may transmit request information of various conditions to the STA (or AP) based on a combination of various fields/elements.

Transmission Periodic Field/Element

When the STA desires to be provided with information in the unsolicited method, it may indicate whether to receive a message including the information periodically or aperiodically through a transmission periodic field.

For example, when the STA desires to receive the information non-periodically, the AP may announce the updated information whenever an update occurs for the information of other APs.

For another example, when the STA instructs to receive the information periodically, the STA may receive a message including the information at periodic intervals set by the STA.

According to an embodiment, the transmission periodic field may be set to 1 bit. When the value of the transmission periodicity field is set to 1, the STA may receive/obtain information through a periodic method for periodically receiving messages. When the value of the transmission periodicity field is set to 0, the STA may receive/obtain information through a method of receiving a message aperiodically.

Transmission Interval Field/Element

According to an embodiment, when the STA wants to receive information periodically from other APs, the STA may directly set the interval. The STA may transmit information on the interval for receiving other AP information based on the transmission interval field. However, the interval should be set shorter than the Beacon transmission interval. For example, when a FILS Discovery frame is used, the interval should be set to 20 μs.

As described above, it may be defined as a separate field in the element indicating the transmission interval, or may be defined as a subfield in the transmission periodic field (periodic field).

According to an embodiment, a field/element defined/configured to obtain additional information on multi-link is not limited to the aforementioned field/element, and various fields/elements may be further configured.

Therefore, the MLD (an AP MLD or a non-AP MLD) may indicate IOM capability through negotiation between the AP MLD and the non-AP MLD using at least one of the aforementioned elements/fields in the multi-link setup process. In addition, the MLD can update the agreement between the MLDs through a separate message exchange after the multi-link setup is completed.

According to an embodiment, when the IOM capability is activated, an AP MLD and a non-AP MLD may operate based on an embodiment for link change and reconnection.

Hereinafter, examples of operations of an AP MLD and a non-AP MLD when IOM capability is activated may be described. For example, the non-AP MLD may request additional information for a multi-link by transmitting the above-described field/elements to the AP MLD. The non-AP MLD may transmit an IOM Capability element including the above-described field/elements to the AP MLD. The inclusion of the above-described field/element in the IOM Capability element is an example, and may be transmitted as an independent field/element.

For example, in the multi-link setup process, the non-AP MLD may transmit an IOM capability element including "Method field=0" and "Info range field=1" to the AP MLD and agree on this with the AP MLD. In this case, after the multi-link setup, the non-AP MLD may operate as a solicited method, and when requesting information, the non-AP MLD may request information for a multi-link including all information included in the beacon (for example, information on other APs). Therefore, an AP MLD only receives a request message from the STA, the AP MLD may provide/transmit information on Link as a response message. When the AP MLD receives a request message, the AP MLD may transmit a response message including information on all links in the AP MLD to the STA. Information on all links in the AP MLD may include all information included in a beacon.

As another example, the non-AP MLD may transmit an IOM Capability element including "Method field=1", "Info range field=0", "Link range=Link id 2", "Info condition field=(value indicating BSS Load through bitmap)" to the AP MLD and agree on this with the AP MLD. In this case, after the multi-link setup, the non-AP MLD may operate as the unsolicited method. Accordingly, the AP may transmit the BSS load information of Link 2 to the STA through a separate message without a separate request message.

As another example, the non-AP MLD may transmit an IOM Capability element including "Method field=0", "Info range field=0", "only updated field or subfield=1", "Info condition field=(value indicating BSS Load through bitmap)" to the AP MLD and agree on this with the AP MLD. In this case, after the multi-link setup, non-AP MLD may operate as the solicited method. Accordingly, when the STA requests information, the AP MLD (or AP) may transmit, to the STA, only updated (changed) information among BSS load information of all APs of the connected AP MLD in a response message.

According to one embodiment, the AP MLD and the non-AP MLD can activate the IOM method proposed in the multi-link setup process or after the multi-link setup through the signaling method proposed in this specification. In addition, an AP MLD and a non-AP MLD may limit the range and type of requested information through various field values in the IOM Capability element.

According to an embodiment, the IOM operation may be performed after precise negotiation for operations between MLDs through the above-described IOM signaling method. However, the IOM operation may be performed by the MLD implementation without a separate signaling process. This may mean that the operation is performed by the AP MLD implementation or by the non-AP MLD implementation without negotiation between the AP MLD and the non-AP MLD.

Based on the above-described embodiments, an AP MLD and a non-AP MLD may operate, however, when the MLD performs IOM operation without a separate signaling exchange, the following restrictions may occur.

1) Restrictions on the solicited method: If information sharing is not supported between APs in the AP MLD, the STA cannot respond to a request for information on another link.

2) Restrictions on the Unsolicited method: The AP may determine the STA that needs additional link information by itself (e.g. beacon period, and the like) and provide a separate message. Therefore, the STA cannot predict in advance whether it will receive this information or not.

When the MLD implements the IOM without a separate signaling method, the operation process is simplified, but there is a problem that the above-mentioned restrictions may occur.

According to an embodiment, a method for requesting multi-link information may be configured based on an agreement between the AP MLD and the non-AP MLD performed using the above-described IOM capability element. Contrary to this, in the case of the solicited method, the STA may wish to temporarily acquire the information by indicating specific information other than the agreed content. In this case, when the STA dynamically sends a request message, it can also be requested by including the indicated content (for example, IOM capability information).

For example, during or after the multi-link setup, the AP MLD and the non-AP MLD agree and the STA may receive information from the AP based on the agreed content. However, the STA may want to temporarily request information of a specific AP or specific parameter information of the APs. In this case, when requesting information, the STA may transmit an "IOM capability" element in the request frame (e.g. probe request frame or (re) association frame or new frame, and the like), including an indication of desired information. The AP may transmit/provide, to the STA, a response message including information requested by the STA based on the request frame. According to an embodiment, when a field in the IOM capability element is omitted, the AP may provide information to the STA based on the previously agreed content.

Accordingly, the MLD (an AP MLD or a non-AP MLD) may perform negotiation between the AP MLD and the non-AP MLD using the above-described element during or after the multi-link setup process. The non-AP MLD may perform an agreement on information to be provided (or information to be received) based on the negotiation and receive it. In addition, the STA may receive only the requested information temporarily by transmitting the request message including an indication of the information desired to be requested. However, when special instructions are omitted from the request message, the non-AP MLD and the AP MLD may operate based on the basic agreed instructions.

According to an embodiment, if it is desired to change the content of the agreement after completion of the multi-link setup, the non-AP MLD and the AP MLD may update the content of the agreement between the MLDs through a separate message exchange.

Figure 28:
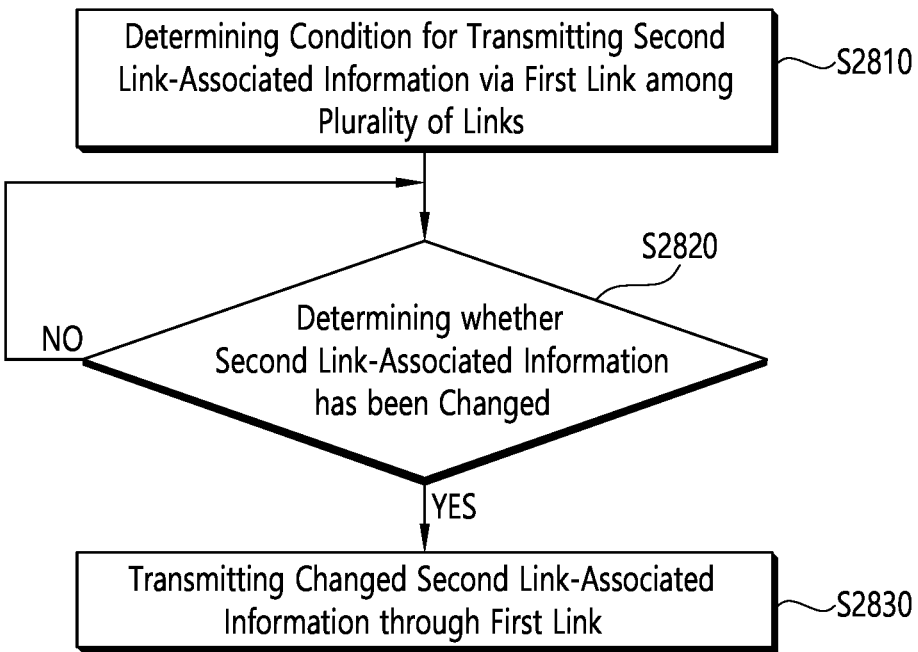
FIG. 28 is a flowchart illustrating an operation of an AP multi-link device.

FIG. 28 is a flowchart illustrating an operation of an AP multi-link device.

Referring to FIG. 28, in step S2810, the AP multi-link device may determine a condition for transmitting second link-associated information via a first link among a plurality of links. For example, the plurality of links may be included in the 2.4 GHz, 5 GHZ, and 6 GHz bands.

For example, the AP multi-link device may be connected to the multi-link device through a plurality of links including a first link and a second link. The AP multi-link device may include a plurality of APs for a plurality of links. The multi-link device may include a first AP and a second AP.

For example, a first AP among the plurality of APs may be connected to a first link. In other words, the first AP may operate in the first link. Also, the first AP may be connected to the first STA of the multi-link device through the first link.

For example, a second AP among the plurality of APs may be connected to a second link. In other words, the second AP may operate in the second link. In addition, the second AP may be connected to the second STA of the multi-link device through the second link.

According to an embodiment, the AP multi-link device may determine a condition for transmitting a second link-associated information through a first link among a plurality of links with a non-AP multi-link device. For example, the AP multi-link device may perform a link setup process with the non-AP multi-link device. The AP multi-link device may determine a condition for transmitting the second link-associated information through the first link in the link setup process. In other words, a condition for transmitting the second link-associated information through the first link may be determined in the link setup process.

As an example, the AP multi-link device may decide to transmit the second link-associated information even when it does not receive a frame for requesting the second link-associated information from the non-AP multi-link device. In other words, the second link-associated information may be transmitted regardless of whether the second link-associated information is requested or not.

As another example, the AP multi-link device may determine to transmit the second link-associated information aperiodically. As another example, the AP multi-link device may determine to transmit the second link-associated information (or changed information) only when the second link-associated information is changed. In other words, the AP multi-link device may transmit the second link-associated information (or changed information) aperiodically based on the change of the second link-associated information.

As another example, the AP multi-link device may determine to periodically transmit the second link-associated information even when the second link-associated information is not changed. In other words, the second link-associated information may be transmitted periodically. In this case, the AP multi-link device may determine a period in which the second link-associated information is transmitted.

In step S2820, the AP multi-link device may determine whether the second link-associated information has been changed. For example, the second link-associated information may include critical information of an AP (for example, the second AP) operating in the second link. In other words, the AP multi-link device may determine whether the critical information of the AP (for example, the second AP) operating in the second link is changed. The critical information of the AP may include information on a Channel Switch Announcement element, an EDCA parameters element, or an Operating Mode Notification element.

According to an embodiment, when the second link-associated information is not changed, the AP multi-link device may wait or periodically determine whether the second link-associated information is changed.

In step S2830, the AP multi-link device may transmit the changed second link-associated information through the first link, based on the second link-associated information being changed.

According to an embodiment, the first link may operate as an anchor link. The second link may operate as a non-anchored link. For example, the AP multi-link device may change the anchor link from the first link to the second link based on the changed second link-associated information.

The above-described step means the operation of the AP multi-link device, but is not limited thereto. The above-described steps may also be performed in a multi-link device (or a non-AP multi-link device).

Figure 29:
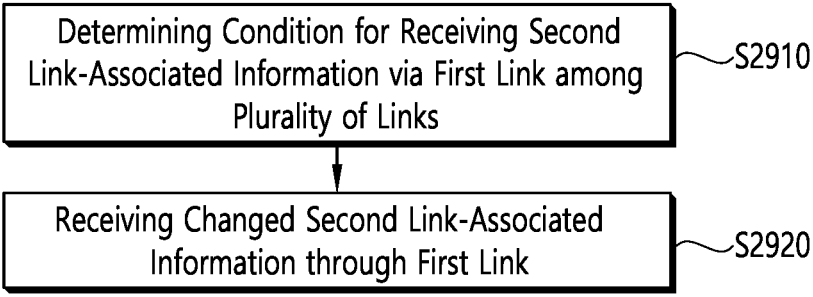
FIG. 29 is a flowchart for explaining the operation of a non-AP multi-link device.

FIG. 29 is a flowchart for explaining the operation of a non-AP multi-link device.

Referring to FIG. 29, in step S2910, the non-AP multi-link device may determine a condition for transmitting a second link-associated information through a first link among a plurality of links.

For example, the non-AP multi-link device may be connected to the AP multi-link device through a plurality of links including a first link and a second link. A non-AP multi-link device may include a plurality of STAs for a plurality of links. The multi-link device may include a first STA and a second STA.

For example, a first STA among the plurality of STAs may be connected to the first link. In other words, the first STA may operate in the first link. Also, the first STA may be connected to the first AP of the AP multi-link device through the first link.

For example, a second STA among the plurality of STAs may be connected to the second link. In other words, the second STA may operate on the second link. In addition, the second STA may be connected to the second AP of the AP multi-link device through the second link.

According to an embodiment, the non-AP multi-link device may determine a condition for transmitting the second link-associated information with the AP multi-link device through the first link among the plurality of links. For example, the non-AP multi-link device may perform a link setup process with the AP multi-link device. The non-AP multi-link device may determine a condition for transmitting the second link-associated information through the first link in the link setup process. In other words, a condition for transmitting the second link-associated information through the first link may be determined in the link setup process.

In step S2910, the non-AP multi-link device may receive the changed second link-associated information through the first link. According to an embodiment, the non-AP multi-link device may receive the changed second link-associated information through the first link, based on the second link-associated information being changed. For example, based on a change in critical information on the second link, the non-AP multi-link device may receive the changed second link-associated information.

The above-described steps refer to the operation of the non-AP multi-link device (or multi-link device), but are not limited thereto. The above-described steps may also be performed in the AP multi-link device.

The technical features of the present disclosure described above may be applied to various devices and methods. For example, the above-described technical features of the present disclosure may be performed/supported through the apparatus of FIGS. 1 and/or 19. For example, the above-described technical features of the present disclosure may be applied only to a part of FIGS. 1 and/or 19. For example, the technical features of the present disclosure described above may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 19. For example, the apparatus of the present disclosure includes a processor and a memory coupled to the processor. The processor may be adapted to determine a condition for transmitting second link-associated information via a first link among the plurality of links; determine whether or not the second link-associated information has changed; and based on the second link-associated information being changed, transmit the changed second link-associated information via the first link.

The technical features of the present disclosure may be implemented based on a computer readable medium (CRM). For example, a CRM proposed by the present disclosure may store instructions which perform operations including the steps of determining a condition for transmitting second link-associated information via a first link among the plurality of links; determining whether or not the second link-associated information has changed; and based on the second link-associated information being changed, transmitting the changed second link-associated information via the first link. The instructions stored in the CRM of the present disclosure may be executed by at least one processor. At least one processor related to CRM in the present disclosure may be the processors 111 and 121 or the processing chips 114 and 124 of FIG. 1, or the processor 610 of FIG. 19. Meanwhile, the CRM of the present disclosure may be the memories 112 and 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by an access point (AP) multi-link device (MLD) in a wireless local area network system, the method comprising:

configuring, by a first AP affiliated with the AP MLD, a first Beacon frame, wherein it is determined that the first AP carries a Channel Switch Announcement element corresponding to a second AP in the first Beacon frame based on a second Beacon frame transmitted by the second AP including the Channel Switch Announcement element corresponding to the second AP and the second AP being affiliated with the AP MLD;

transmitting, by the first AP, the first Beacon frame including the Channel Switch Announcement element corresponding to the second AP based on the second Beacon frame including the Channel Switch Announcement element corresponding to the second AP and the second AP being affiliated with the AP MLD; and based on the first Beacon frame, transmitting, by the first AP, an extremely high throughput (EHT) physical protocol data unit (PPDU) including a legacy signal (L-SIG) field, a repeated L-SIG (RL-SIG) field which is contiguous to the L-SIG field, a universal signal (U-SIG) field which is contiguous to the RL-SIG field, wherein the L-SIG field includes a length field which has a value satisfying a condition that a remainder is zero when the length field is divided by three, and the remainder differentiates the EHT PPDU from a high efficiency (HE) PPDU, wherein the RL-SIG field is a repeat of the L-SIG field, wherein the RL-SIG field includes four extra subcarriers at frequency indexes of {−28, −27, 27, 28}, and values on the four extra subcarriers are {−1, −1, −1, 1}, respectively, wherein the U-SIG field carries information to interpret the EHT PPDU, wherein the U-SIG field includes version independent fields followed by version dependent fields, wherein the version independent fields include first information related to a physical version of the EHT PPDU, second information related to a bandwidth of the EHT PPDU, third information related to an identifier of a BSS, fourth information indicating that the EHT PPDU is transmitted in downlink (DL), and fifth information related to a transmission opportunity (TXOP).

2. The method of claim 1, wherein the first AP is a reporting AP operating on a first link and the second AP is a reported AP operating on a second link.

3. An access point (AP) multi-link device (MLD) in a wireless local area network system, comprising:

at least one processor; and at least one computer memory operably connectable to the at least one processor and storing instructions that, based on being executed by the at least one processor, perform operations comprising:

configuring, by a first AP affiliated with the AP MLD, a first Beacon frame, wherein it is determined that the first AP carries a Channel Switch Announcement element corresponding to a second AP in the first Beacon frame based on a second Beacon frame transmitted by the second AP including the Channel Switch Announcement element corresponding to the second AP and the second AP being affiliated with the AP MLD;

transmitting, by the first AP, the first Beacon frame including the Channel Switch Announcement element corresponding to the second AP based on the second Beacon frame including the Channel Switch Announcement element corresponding to the second AP and the second AP being affiliated with the AP MLD; and based on the first Beacon frame, transmitting, by the first AP, an extremely high throughput (EHT) physical protocol data unit (PPDU) including a legacy signal (L-SIG) field, a repeated L-SIG (RL-SIG) field which is contiguous to the L-SIG field, a universal signal (U-SIG) field which is contiguous to the RL-SIG field, wherein the L-SIG field includes a length field which has a value satisfying a condition that a remainder is zero when the length field is divided by three, and the remainder differentiates the EHT PPDU from a high efficiency (HE) PPDU, wherein the RL-SIG field is a repeat of the L-SIG field, wherein the RL-SIG field includes four extra subcarriers at frequency indexes of {−28, −27, 27, 28}, and values on the four extra subcarriers are {−1, −1, −1, 1}, respectively, wherein the U-SIG field carries information to interpret the EHT PPDU, wherein the U-SIG field includes version independent fields followed by version dependent fields, wherein the version independent fields include first information related to a physical version of the EHT PPDU, second information related to a bandwidth of the EHT PPDU, third information related to an identifier of a BSS, fourth information indicating that the EHT PPDU is transmitted in downlink (DL), and fifth information related to a transmission opportunity (TXOP).

4. The AP MLD of claim 3, wherein the first AP is a reporting AP operating on a first link and the second AP is a reported AP operating on a second link.

* * * * *